(12) United States Patent
Yamamoto et al.

(10) Patent No.: US 9,110,753 B2
(45) Date of Patent: Aug. 18, 2015

(54) SYSTEM AND METHOD FOR INSTALLING SOFTWARE APPLICATIONS

(71) Applicant: Nintendo Co., Ltd., Kyoto (JP)

(72) Inventors: Kenji Yamamoto, Kyoto (JP); Tsutomo Kaneshige, Kyoto (JP); Yusuke Shibata, Kyoto (JP); Takeshi Shimada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/080,521

(22) Filed: Nov. 14, 2013

(65) Prior Publication Data

US 2014/0123131 A1 May 1, 2014

Related U.S. Application Data

(62) Division of application No. 12/617,592, filed on Nov. 12, 2009, now Pat. No. 8,621,457.

(51) Int. Cl.
| | |
|---|---|
| G06F 9/445 | (2006.01) |
| G06F 9/44 | (2006.01) |
| G06F 3/0481 | (2013.01) |
| G06F 3/0482 | (2013.01) |

(52) U.S. Cl.
CPC ............... *G06F 8/61* (2013.01); *G06F 3/0482* (2013.01); *G06F 3/04817* (2013.01); *G06F 8/60* (2013.01); *G06F 9/4443* (2013.01)

(58) Field of Classification Search
CPC ...... G06F 8/61; G06F 3/0482; G06F 3/04817
See application file for complete search history.

(56) References Cited

U.S. PATENT DOCUMENTS

| | | | |
|---|---|---|---|
| 5,740,549 A | 4/1998 | Reilly et al. | |
| 5,845,077 A * | 12/1998 | Fawcett | 709/221 |
| 6,014,638 A | 1/2000 | Burge et al. | |
| 6,094,679 A * | 7/2000 | Teng et al. | 709/220 |
| 6,345,386 B1 | 2/2002 | Delo et al. | |
| 6,353,926 B1 * | 3/2002 | Parthesarathy et al. | 717/170 |
| 6,367,073 B2 | 4/2002 | Elledge | |
| 6,712,704 B2 | 3/2004 | Eliott | |
| 7,143,406 B2 * | 11/2006 | Kenyon et al. | 717/173 |
| 7,203,835 B2 | 4/2007 | Multerer et al. | |
| 7,263,663 B2 | 8/2007 | Ballard et al. | |
| 7,546,534 B1 | 6/2009 | Andrews et al. | |
| 7,548,988 B2 | 6/2009 | Philyaw et al. | |
| 7,631,061 B2 | 12/2009 | Lucovsky et al. | |
| 7,975,021 B2 | 7/2011 | Jarman et al. | |
| 8,069,461 B2 | 11/2011 | Angiolillo et al. | |

(Continued)

*Primary Examiner* — Jing-Yih Shyu
(74) *Attorney, Agent, or Firm* — Nixon & Vanderhye, P.C.

(57) ABSTRACT

An example computer apparatus includes a processor coupled to a memory storing a program. The processor executes the program to perform operations including displaying an application menu screen displaying at least a selectable first menu item for an uninstalled first application and a selectable second menu item for an installed second application; periodically determining availability/unavailability of the first application for download from another computer apparatus; in response to selection of the first menu item if the most recent periodic determining has determined that the first application is unavailable for download from the server, providing announcement information about the first application; and in response to selection of the first menu item if the most recent periodic determining has determined that the first application is available for download from the server, initiating a process for downloading and installing the first application.

22 Claims, 17 Drawing Sheets

(56) References Cited

U.S. PATENT DOCUMENTS

| | | |
|---|---|---|
| 8,185,877 B1 | 5/2012 | Colcord |
| 8,645,948 B2 * | 2/2014 | Kelley .................. 717/176 |
| 2002/0056109 A1 | 5/2002 | Tomsen |
| 2003/0115287 A1 | 6/2003 | Irfan et al. |
| 2003/0161455 A1 | 8/2003 | Lemchen et al. |
| 2003/0220983 A1 | 11/2003 | Hui |
| 2004/0039795 A1 | 2/2004 | Percival |
| 2004/0133657 A1 | 7/2004 | Smith et al. |
| 2004/0181790 A1 | 9/2004 | Herrick |
| 2005/0027382 A1 | 2/2005 | Kirmse et al. |
| 2005/0114229 A1 | 5/2005 | Ackley |
| 2005/0144641 A1 | 6/2005 | Lewis |
| 2008/0004115 A1 | 1/2008 | Chatani |
| 2008/0078758 A1 | 4/2008 | Shimura et al. |
| 2009/0158344 A1 | 6/2009 | Anglin, Jr. |
| 2009/0228982 A1 | 9/2009 | Kobayashi |
| 2009/0241107 A1 | 9/2009 | Kobayashi |
| 2009/0297066 A1 | 12/2009 | Hatayama et al. |
| 2010/0148823 A1 | 6/2010 | Shimizu |
| 2010/0280956 A1 | 11/2010 | Chutorash et al. |
| 2011/0099584 A1 | 4/2011 | Rodriguez |

* cited by examiner

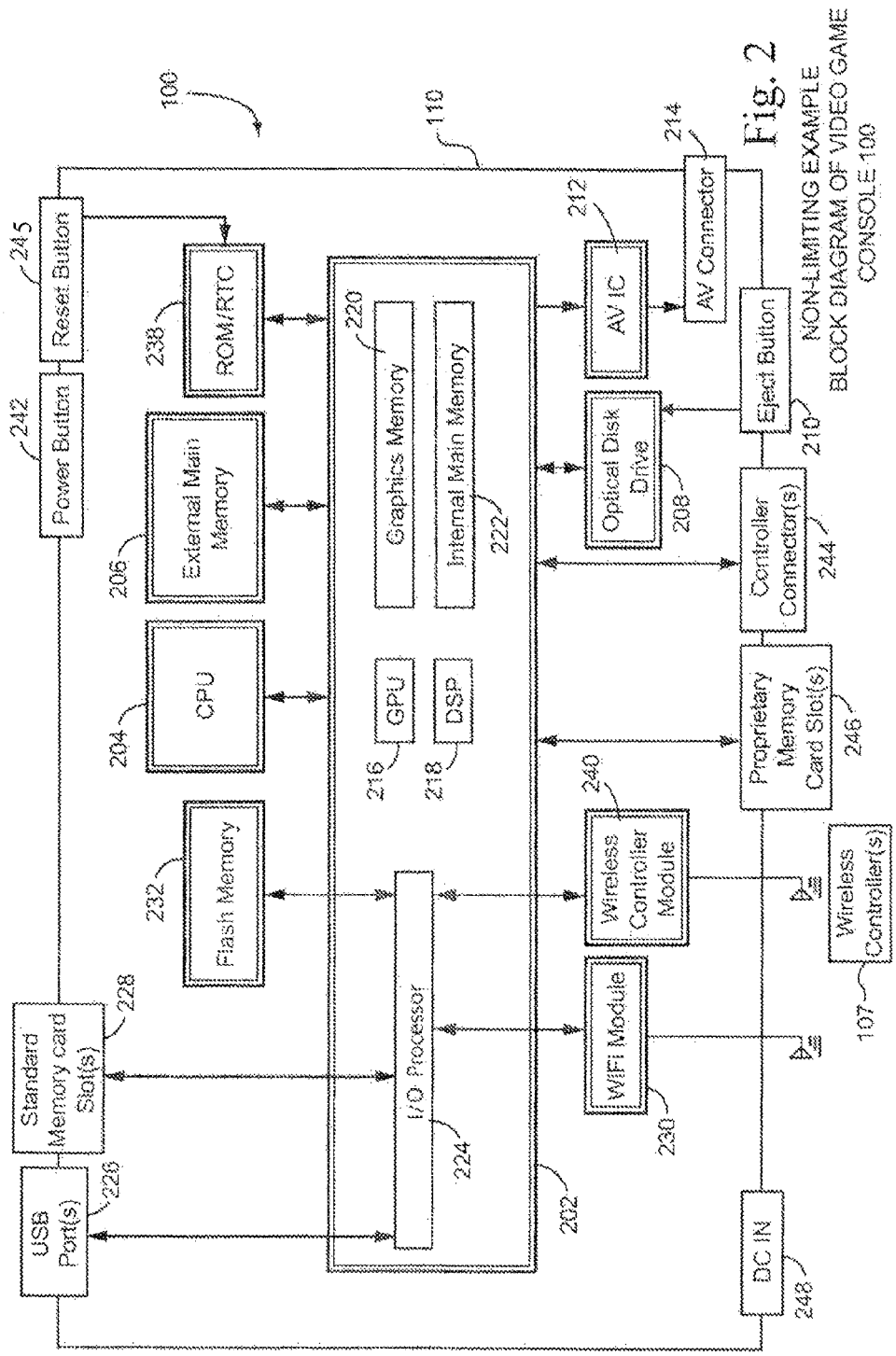

SYSTEM AND METHOD FOR INSTALLING SOFTWARE APPLICATIONS

CROSS-REFERENCE TO RELATED APPLICATION

This application is a divisional of application Ser. No. 12/617,592, filed Nov. 12, 2009, now U.S. Pat. No. 8,621,457, the contents of which are incorporated herein in their entirety.

BACKGROUND AND SUMMARY

The systems and methods described herein relate to installing software applications on computer systems such as video game systems.

Software applications for computer systems may be pre-installed or may be loaded onto the systems after purchase, for example by downloading from a web site or using physical media such as optical disks.

One known system for downloading software applications to a video game system is discussed with reference to the channel menu shown in FIG. 7. The channel menu in FIG. 7 includes a number of menu items ("channels") 701 which may be selected by a user to invoke software applications such as games, shopping, internet access and the like. Certain of the channels may correspond to software applications which were not pre-installed on the game system. In FIG. 7, applications for the Forecast channel (for weather forecasts) and the News channel (for current news) are not pre-installed. When a user selects one of these channels, the game system is connected to a web site and thereafter initiates a system software/firmware update. This update includes the Forecast and/or News channels and the user can then select these channels to invoke the corresponding Forecast and News applications. The Forecast and News channel applications are system applications which cannot be deleted by the users and which are updated together with system programs such as firmware programs. Thus, in order to install such programs on the video game system, the entire system software/firmware must be updated and all system applications are updated together.

The systems and methods described herein permit software applications to be installed onto a computer system without requiring a system update. The software applications are treated as user applications which can, for example, be installed separately and independently from each other and which can be deleted by users.

One example method of installing an application onto an apparatus involves displaying an application menu screen comprising a fixed number of menu item display locations, at least one of the menu item display locations displaying a first menu item for a non-installed application. An announcement screen is displayed in response to selection of the first menu item for the non-installed application, the announcement screen comprising a selection item configured to initiate a downloading operation for the non-installed application. The downloading operation is initiated in response to selection of the selection item. The application can be installed/non-installed separately from other applications.

BRIEF DESCRIPTION OF THE DRAWINGS

FIG. 2 is a detailed block diagram showing the components of game console 100 of FIG. 1.

FIGS. 6A-6G-2 are flow charts showing a second example method for installing a software application.

DETAILED DESCRIPTION OF EXAMPLE EMBODIMENTS

The example systems and methods described herein provide intuitive and user-friendly ways to install software applications on a computer system such as a video game console system. Of course, these systems and methods may be readily applied to systems other than video game console systems including, but not limited to, personal computers, cellular telephones, smartphones, personal digital assistants (PDAs), telephony-enabled PDAs, handheld video game systems, and the like.

Figure 1:
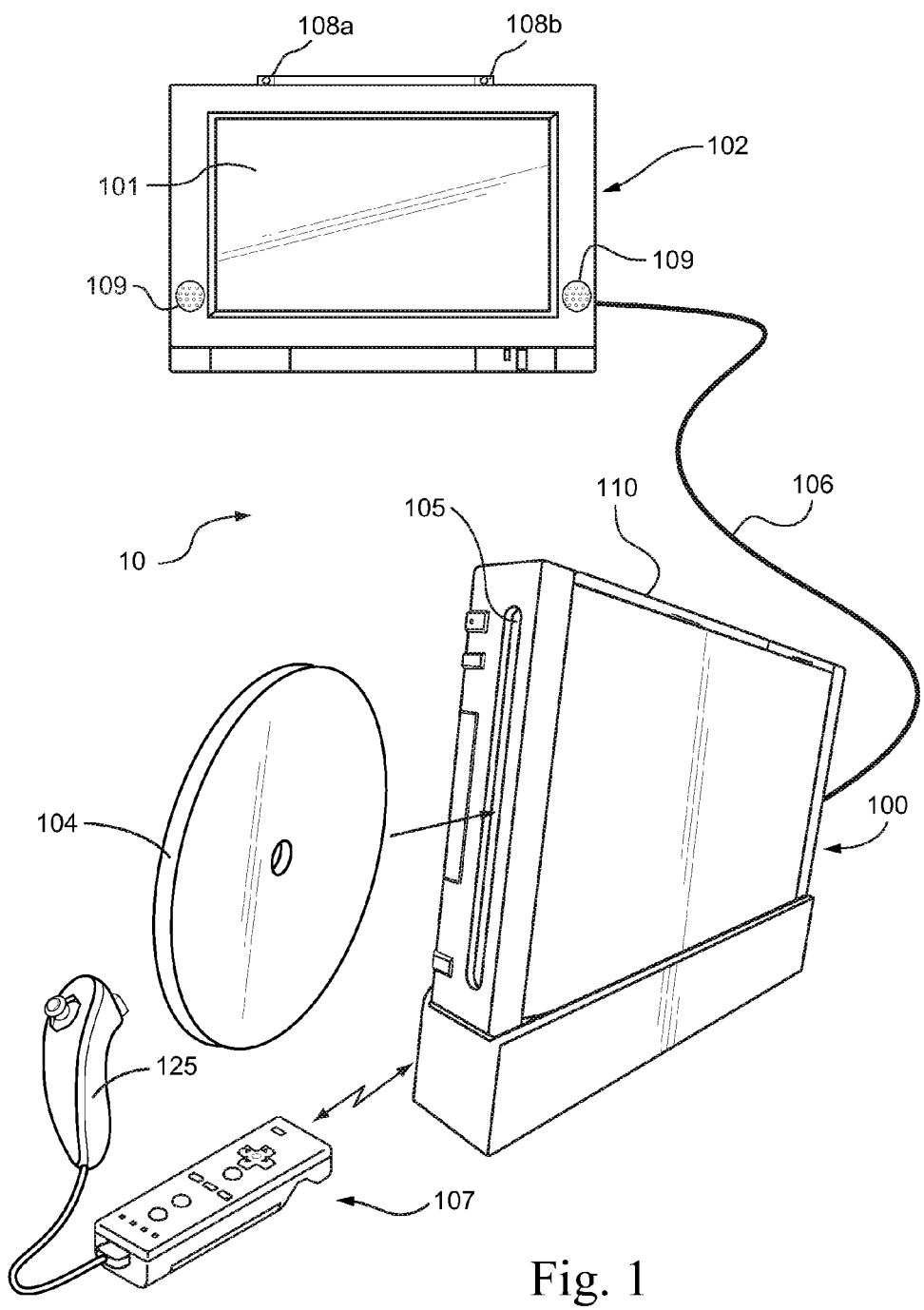
FIG. 1 shows an example game system in which the systems and methods described herein can be used.

FIG. 1 shows a non-limiting example game system 10 in which the systems and methods for installing software applications described herein may be used. As shown in FIG. 1, example game system 10 includes a game console 100, a television 102 and a controller 107.

Game console 100 executes a game program(s) or other software application(s) stored on optical disc 104 inserted into slot 105 formed in housing 110 thereof. The result of the execution of the game program or other application is displayed on display screen 101 of television 102 to which game console 100 is connected by cable 106. Audio associated with the game program or other application is output via speakers 109 of television 102. While an optical disk is shown in FIG. 1, the game program or other application may alternatively or additionally be stored on other removable or non-removable storage media such as semiconductor memories, magneto-optical memories, magnetic memories and the like.

Controller 107 wirelessly transmits data such as game control data to the game console 100. The game control data may be generated using an operation section of controller 107 having, for example, a plurality of operation buttons, a key, a stick and the like. Controller 107 may also wirelessly receive data transmitted from game console 100. Any one of various wireless protocols such as BLUETOOTH ® wireless protocol may be used for the wireless transmissions between controller 107 and game console 100.

A "nunchuk" controller 125 may be connected to controller 107. Although a wired connection is shown in FIG. 1 between controller 107 and nunchuk controller 125, alternatively, a wireless connection may be used. Nunchuk controller 125 may be held in the user's "other" hand (i.e., the hand not holding controller 107) and provides additional game control data to video game console 100.

Controller 107 also includes an imaging information calculation section (not shown) for capturing and processing images from light-emitting devices 108a and 108b. Although markers 108a and 108b are shown in FIG. 1 as being above television 100, they may also be positioned below television 100. In one implementation, a center point between light-emitting devices 108a and 108b is substantially aligned with a vertical center-line of display screen 101. The images from light-emitting devices 108a and 108b can be used to determine a direction in which controller 107 is pointing as well as a distance of controller 107 from display screen 101. By way of example without limitation, light-emitting devices 108a and 108b may be implemented as two LED modules (hereinafter, referred to as "markers") provided in the vicinity of the display screen of television 102. The markers each output infrared light and the imaging information calculation section of controller 107 detects the light output from the LED modules to determine a direction in which controller 107 is pointing and a distance of controller 107 from display 101 as mentioned above. Additional details of the imaging operation may be found in U.S. Patent Publication No. 2007-0066394 A1; U.S. Patent Publication No. 2007-0072674 A1; and U.S. Patent Publication No. 2007-0060228 A1. The entire contents of each of these applications are expressly incorporated herein.

Controller 107 also preferably includes accelerometers and/or gyroscopes. For example, controller 107 may include a three-axis, linear acceleration sensor that detects linear acceleration in three directions, e.g., the up/down direction, the left/right direction, and the forward/backward direction. Linear accelerometers are only capable of detecting acceleration along a straight line corresponding to each axis of the acceleration sensor. In other words, the direct output of the acceleration sensor is limited to signals indicative of linear acceleration (static or dynamic) along each of the axes thereof. As a result, the acceleration sensor cannot directly detect movement along a non-linear (e.g. arcuate) path, rotation, rotational movement, angular displacement, tilt, position, attitude or any other physical characteristic. However, through additional processing of the linear acceleration signals output from the acceleration sensor, additional information relating to controller 107 can be inferred or calculated (determined). For example, by detecting static, linear acceleration (i.e., gravity), the linear acceleration output of the acceleration sensor can be used to determine tilt of the controller relative to the gravity vector by correlating tilt angles with detected linear acceleration. In this way, the acceleration sensor can be used in combination with a micro-computer (not shown) of controller 107 (or another processor such as a processor of the video game console 100) to determine tilt, attitude or position of controller 107. Similarly, various movements and/or positions of controller 107 can be calculated through processing of the linear acceleration signals generated by the acceleration sensor when controller 107 containing the acceleration sensor is subjected to dynamic accelerations by, for example, the hand of a user.

Gyroscopes can be used in addition to, or in place of, the acceleration sensor for calculating movements and positions of the controller.

Figure 6A:
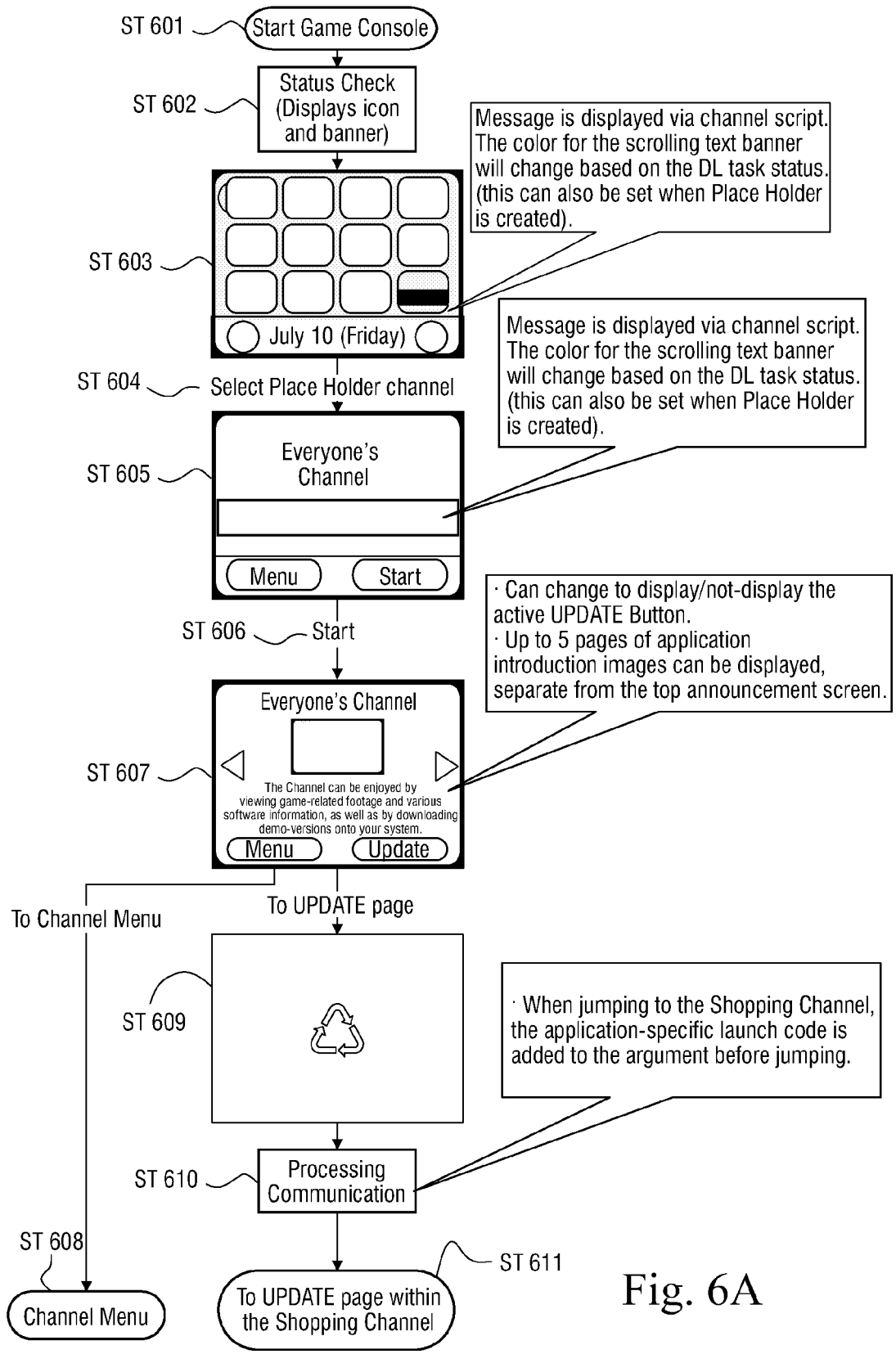
Figure 6B:
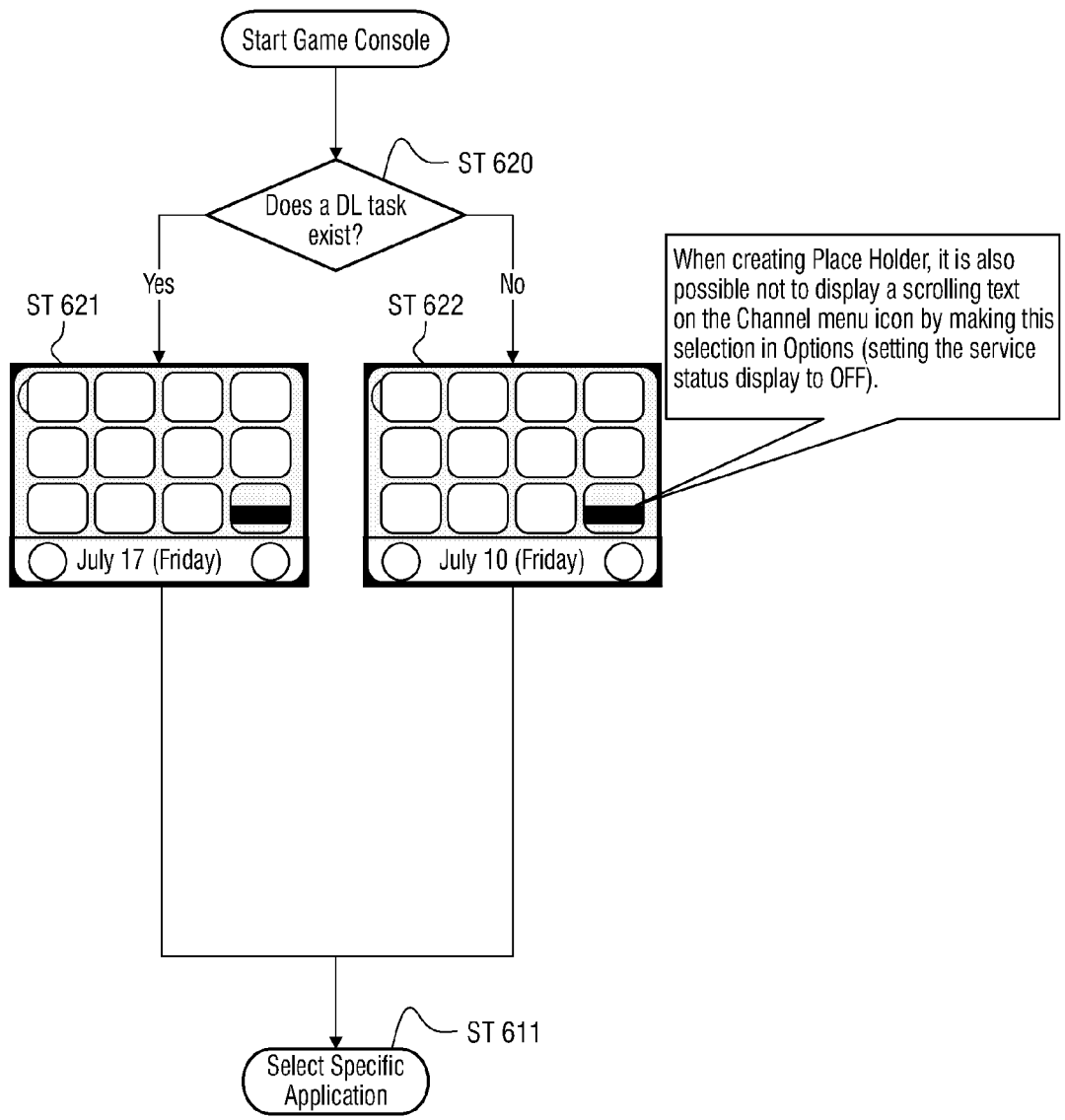
Figure 6C:
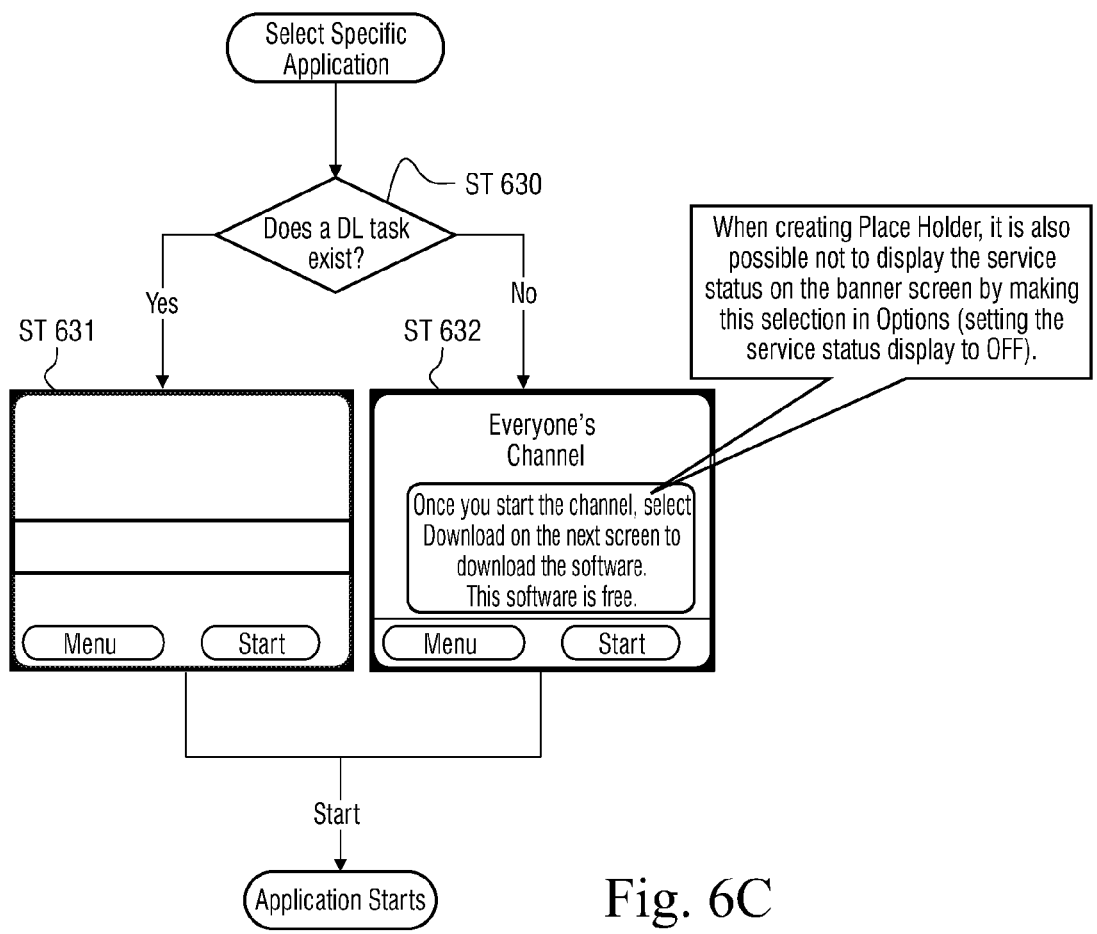
Figure 6D:
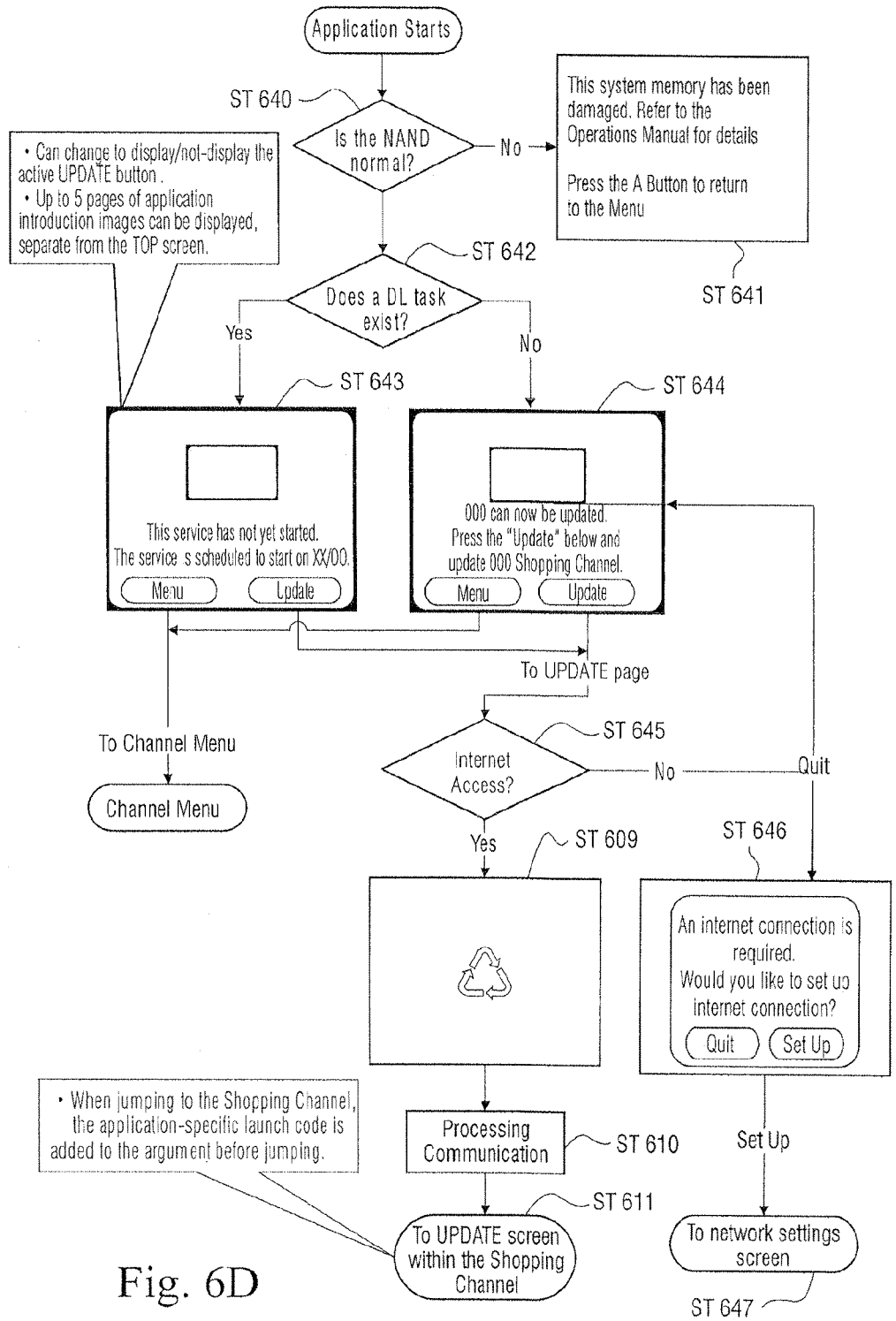
Figure 6E:
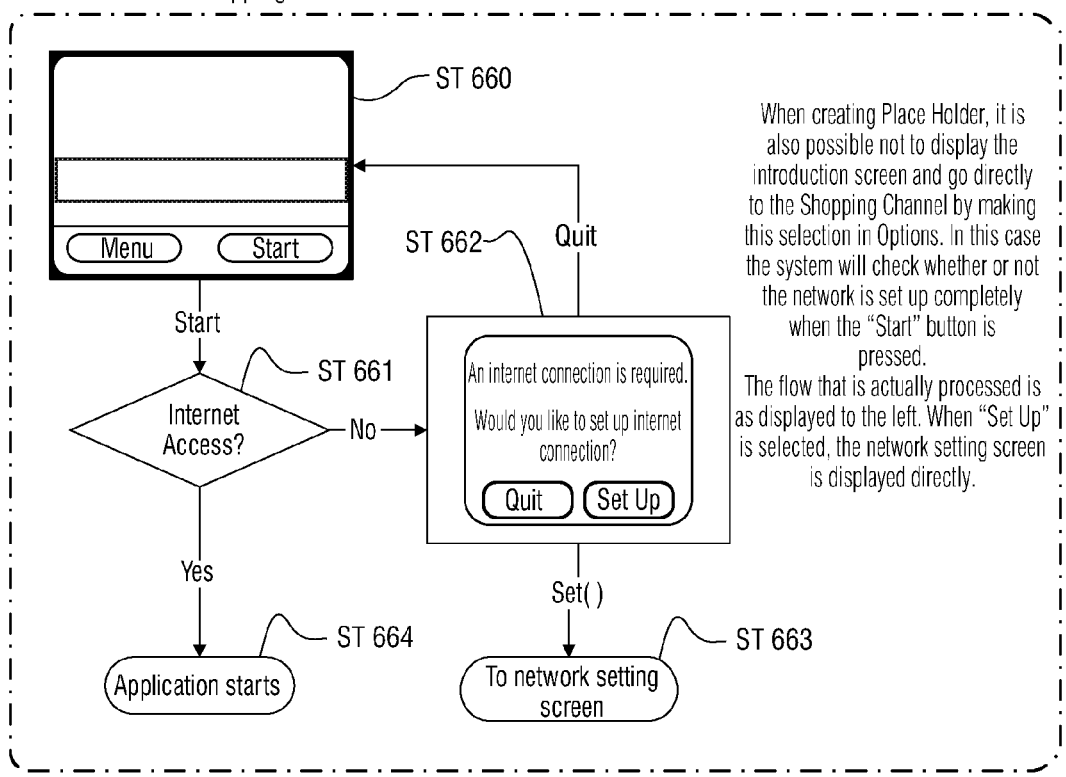
Figure 6F:
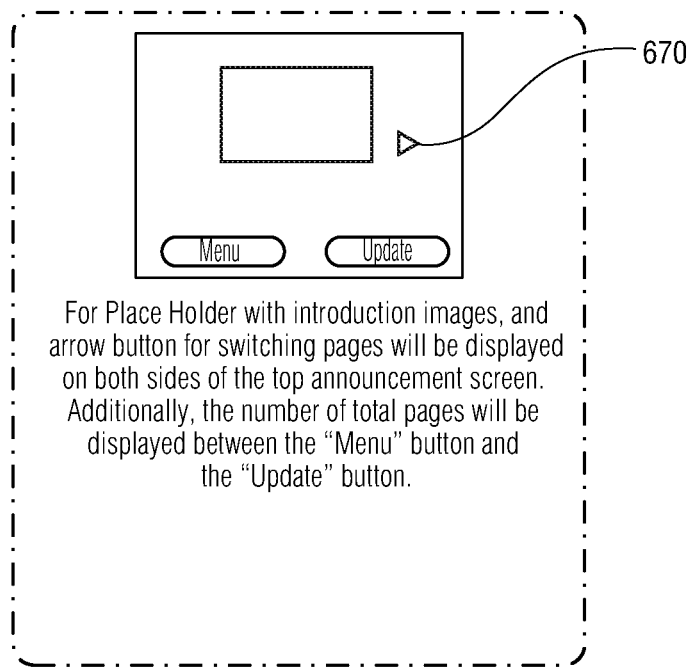
Figures 1, 6G:
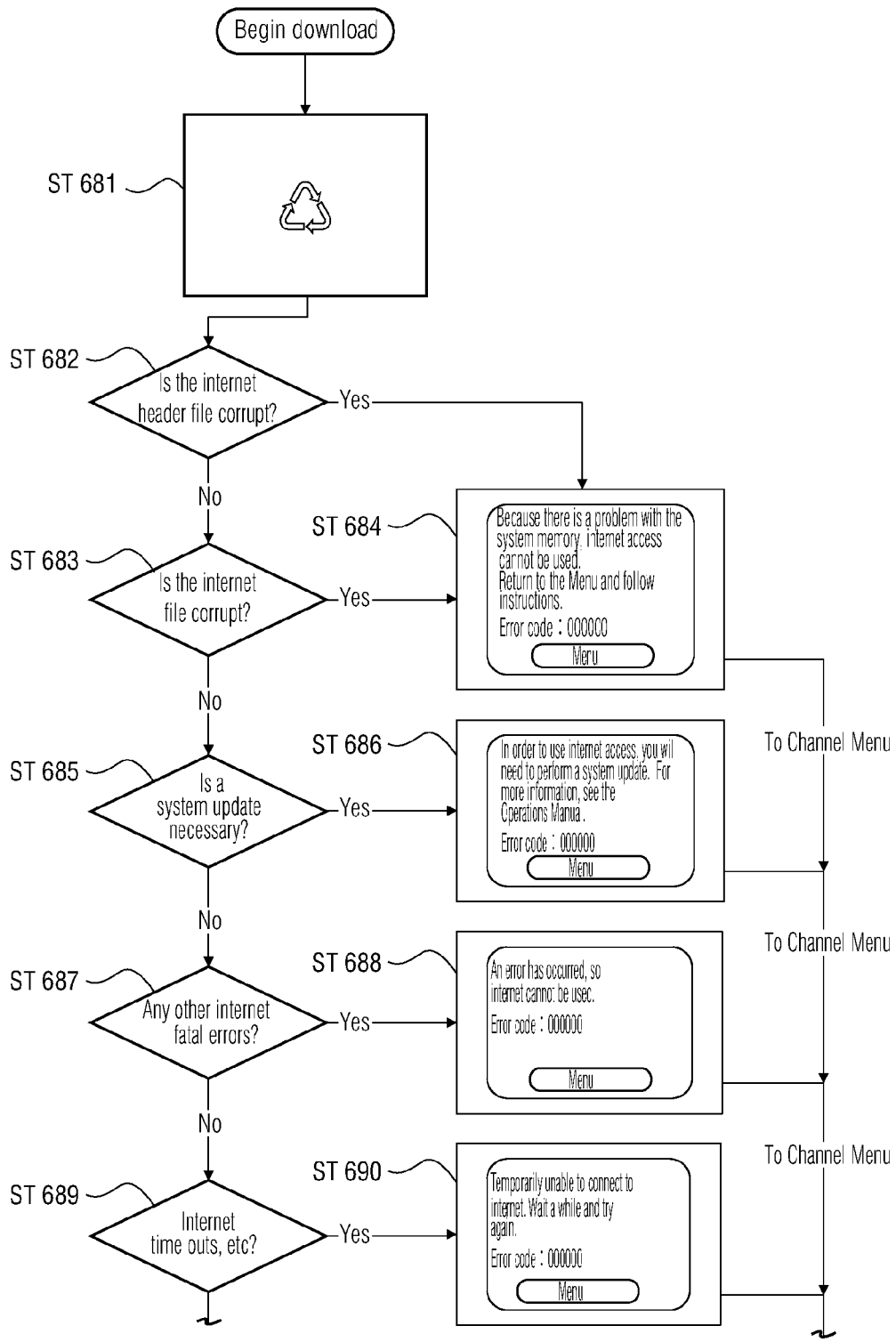
Figures 2, 6G:
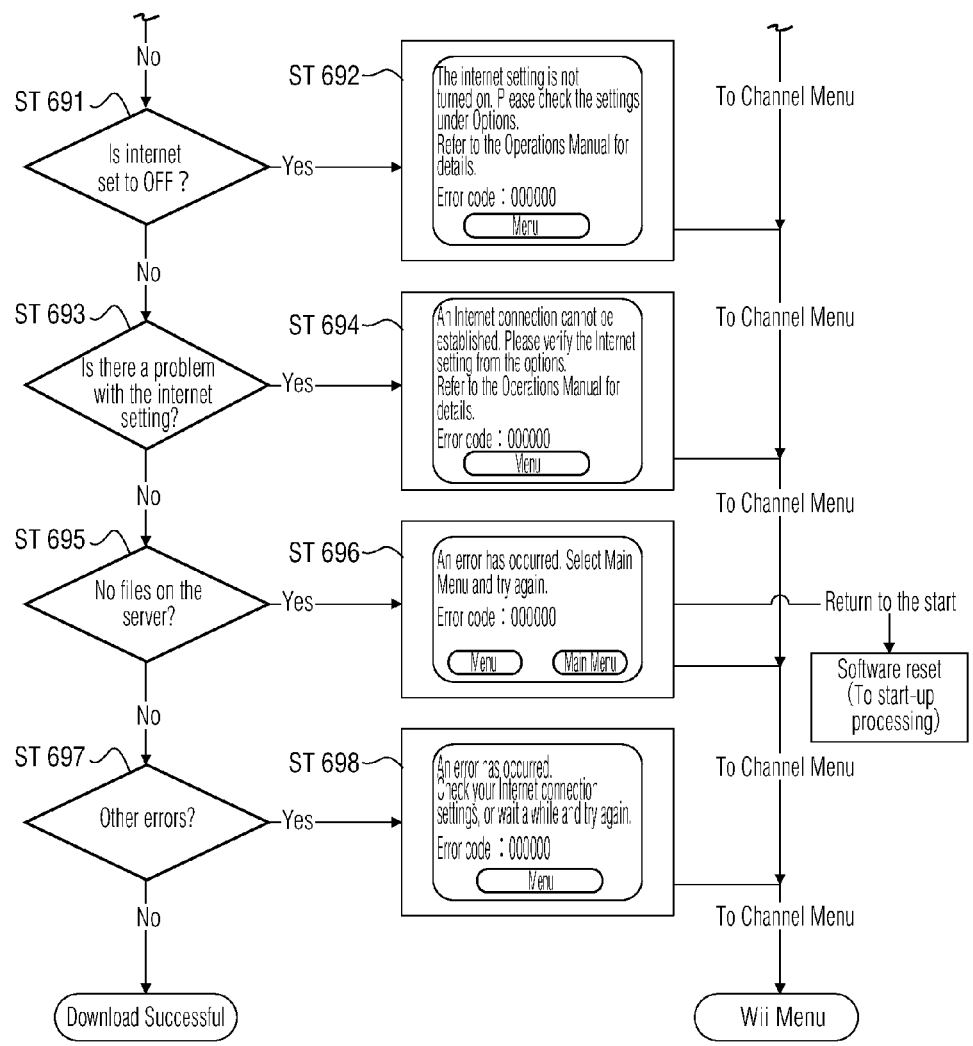
Figure 7:
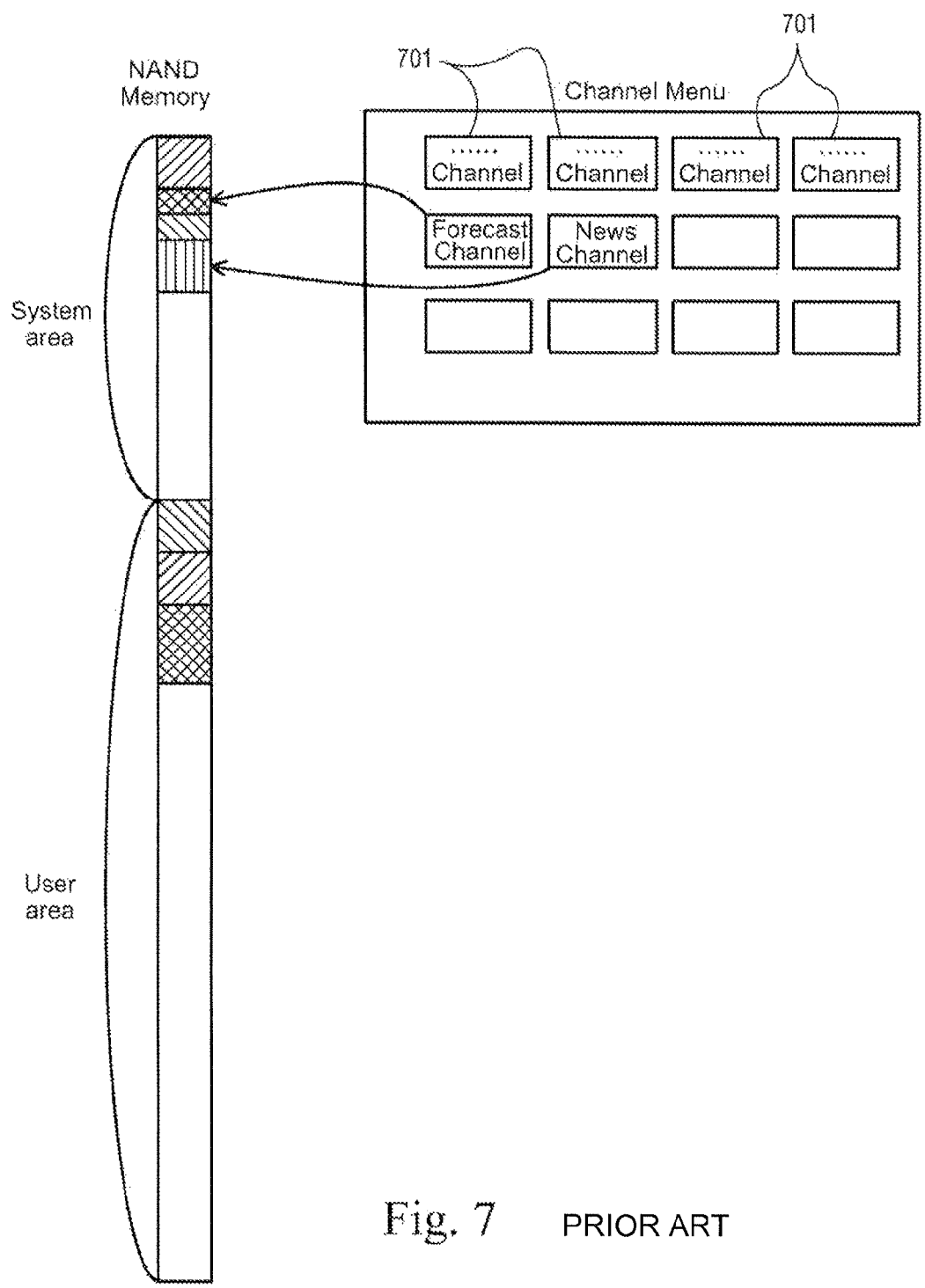
FIG. 7 is used in an explanation of a known system and method for downloading software applications to a game system.

With reference to the block diagram of FIG. 2, game console 100 includes a RISC central processing unit (CPU) 204 for executing various types of software applications including (but not limited to) video game programs. CPU 204 executes a boot program stored, for example, in a boot ROM to initialize game console 100. CPU 204 can also execute a software application (or applications) stored on optical disc 104, which is inserted in optical disk drive 208, or in some other memory accessible to CPU 204. User-accessible eject button 210 provided on housing 110 of game console 100 may be used to eject an optical disk from disk drive 208.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, speakers, microphones, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers but of course this use is provided by way of illustration, not limitation. For example, a player may store game data for a particular game on a memory card and bring the memory card to a friend's house to play the game on the friend's game console. The memory cards may also be used to transfer data between the game console and personal computers, digital cameras, and the like. Content such as photos and music contained on memory cards inserted into slot 228 may be accessed via the user interface of the console for output, for example, using the display screen 101 and speakers 109 of television 102.

WiFi module 230 enables game console 100 to be connected to a wireless access point. The access point may provide internet connectivity for on-line gaming with players at other locations (with or without voice chat capabilities), as well as web browsing, e-mail, software downloads (including downloads of game software and other applications) and many other types of on-line activities. In some implementations, WiFi module 230 may also be used for communication with other game devices such as suitably-equipped hand-held game devices. Module 230 is referred to herein as "WiFi", which is generally a designation used in connection with the family of IEEE 802.11 specifications. However, game console 100 may of course alternatively or additionally use wireless modules that conform to other wireless standards.

Flash memory 232 stores, by way of example without limitation, game save data, system files, internal applications for the console and downloaded data (such as games).

Wireless controller module 240 receives signals wirelessly transmitted from one or more controllers 107 and provides these received signals to IO processor 224. The signals transmitted by controller 107 to wireless controller module 240 may include signals generated by controller 107 itself as well as signals generated by other devices such as nunchuk controller 125 that may be connected to controller 107. Of course, in other implementations, nunchuk controller 125 may directly communicate signals (by wire or wirelessly) to wireless controller module 240 of console 100. As mentioned above, the communications may use the BLUETOOTH wireless protocol.

Wireless controller module 240 may also wirelessly transmit signals to controller 107. By way of example without limitation, controller 107 (and/or another game controller such as nunchuk controller 125 connected thereto) may be provided with vibration circuitry and vibration circuitry control signals may be sent via wireless controller module 240 to control the vibration circuitry (e.g., by turning the vibration circuitry on and off). By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240. It will be appreciated that wireless controller module 240 can communicate signals to nunchuk 125 either directly or via controller 107.

Proprietary memory card slots 246 are adapted to receive proprietary memory cards. In one example implementation, two such slots are provided. These proprietary memory cards have some non-standard feature(s) such as a non-standard connector and/or a non-standard memory architecture. For example, one or more of the memory card slots 246 may be adapted to receive memory cards used with the Nintendo GameCube platform. In this case, memory cards inserted in such slots can transfer data from games developed for the GameCube platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective game controllers. In one example implementation, four such connectors are provided for wired connection to game controllers for the Nintendo GameCube platform. Alternatively, respective wireless receivers may be connected to connectors 244 to receive signals from wireless game controllers. These connectors enable players, among other things, to use controllers for the Nintendo GameCube platform when an optical disk for a game developed for this platform is inserted into optical disk drive 208.

A connector 248 is provided for connecting game console 100 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program or other software application, applet, script, etc. read from optical disc 104 by the CPU 204, a game program or other application, applet, script, etc. read from flash memory 232 by CPU 204, various types of data and the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 must be depressed for a specified time (e.g., one or two seconds) to turn the console off so as to reduce the possibility of inadvertently turn-off. Reset button 245 is used to reset (re-boot) game console 100.

Figure 3:
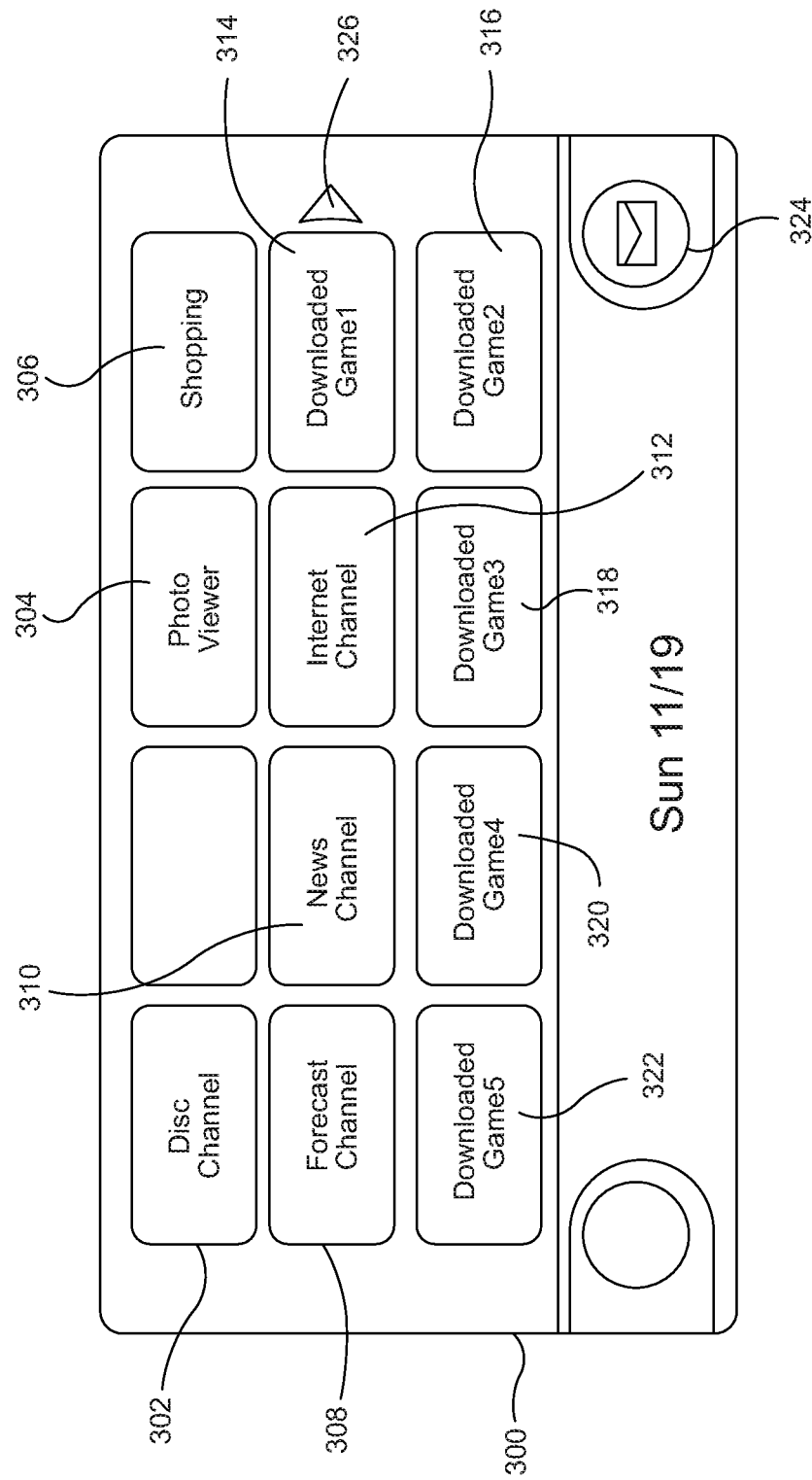
FIG. 3 shows an example user interface for game system 10.

FIG. 3 shows an example user interface for game system 10. In particular, FIG. 3 shows a menu 300 which is generated by game console 100 for display on television 102. This menu is a channel menu that is displayed on television screen 101 and allows users to select one of a plurality of different "channels" for accessing various features of game console 100. The channel selection input and other selection inputs may be provided by positioning an on-screen cursor using the optical position detection feature of controller 107 and then pressing a "select" button or trigger of remote control 107. Of course, other techniques for making selections may be used and the systems and methods described herein are not limited in this respect.

While the channels shown in FIG. 3 contain textual channel descriptions, other content such as images, graphics, video and/or sound may also be associated with some or all of the channels on the channel menu.

By way of example and without limitation, a disc channel 302 allows users to play discs inserted in optical disc drive 208. As noted above, the inserted disc may contain games or other software applications.

A photo viewer channel 304 allows users to retrieve digital pictures from a memory card inserted into standard memory card slot(s) 228 of video game console 100 and display them on television screen 101.

A shopping channel 306 allows users to shop for items, which may be either free or may require payment. These shopping items may include, but are not limited to, video games or other software applications which may be downloaded from a server to console 100 for storage, for example, in flash memory 232. After users download games or software applications using shopping channel 306, each downloaded game or application can, if desired, appear in the channel menu of FIG. 3 as its own channel. To play the downloaded game or to execute the downloaded application, users simply select the corresponding channel. In FIG. 3, channels 314, 316, 318, 320 and 322 correspond to channels for downloaded games.

A forecast channel 308 allows users to access and display local weather forecasts (e.g., retrieved from the Internet) after turning on video game console 100. The weather information can be automatically updated by accessing the Internet.

A news channel 310 allows users to access and display local, national and world news (e.g., retrieved from the Internet), which may be organized into a variety of topical categories. The news can be automatically updated by accessing the Internet.

An internet channel 312 allows the user to access the internet to, for example, access web sites using a browser running on console 100.

Right arrow 326 may be selected to move to a different page of the channel menu. A left arrow (not shown) may be present and is selectable when there are pages to the left of the current page. Game console 100 may, if desired, be programmed to limit the channel menu to only displaying up to a certain maximum number of channels (e.g., up to five pages each having twelve channels). This limitation is not a storage capacity issue, but rather a user interface management issue.

The channel menu may also contain a menu bar that provides information such as time/date and includes other selection items such as an email icon 324 for launching an email application.

Figure 4:
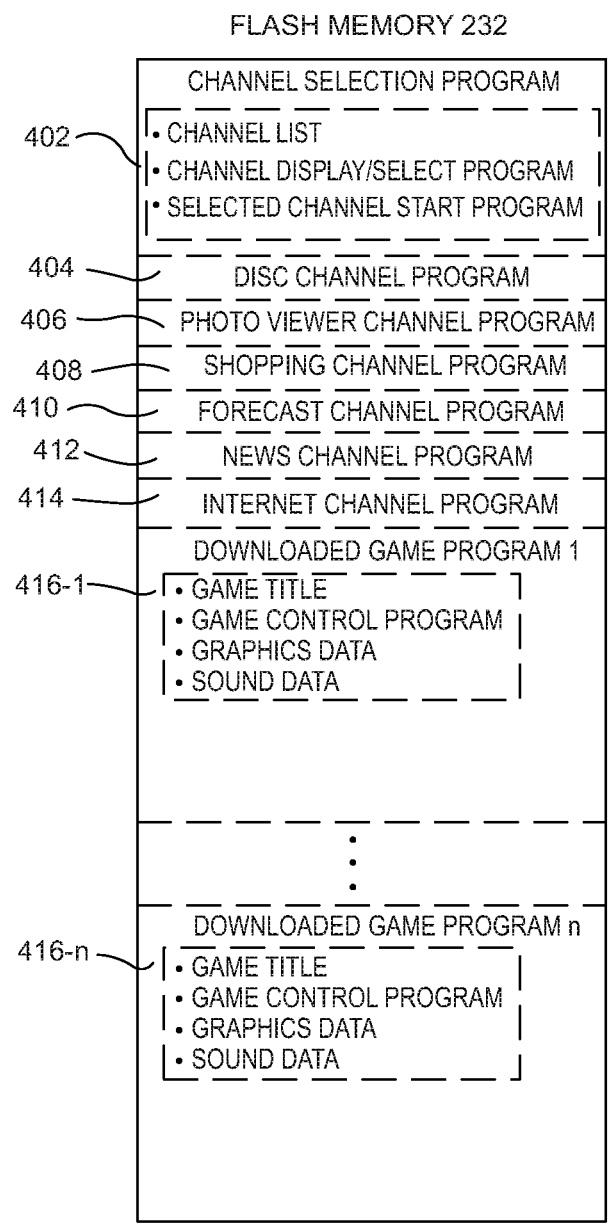
FIG. 4 shows an example memory map for flash memory 232 of game console 100.

FIG. 4 shows an example memory map for flash memory 232. The map of FIG. 4 is provided by way of example without limitation and the various programs may be readily organized in different manners and even using different and/ or additional memories (e.g., memory cards inserted into standard memory card slot 228).

Flash memory 232 stores a channel selection program 402 for generating and displaying the channel menu and allowing users to make selections from the menu. Channel selection program 402 includes, by way of example without limitation, a channel list, a display/select program and a selected channel start program.

Programs for each of the channels are also contained in flash memory 232. Consequently, flash memory 232 includes disc channel program 404, photoviewer channel program 406, shopping channel program 408, forecast channel program 410, news channel program 412 and internet channel program 414. As noted above by way of example, after users download video game programs or other programs, applications, applets, scripts, etc. via shopping channel 406, each downloaded video game program or application may appear in the channel menu as its own channel.

Each downloaded video game program or other program, application, etc. may be stored in flash memory 232. When a particular one of these video game programs, applications, etc. is selected from the channel menu, the corresponding program is loaded into internal/external memory 222/206 for execution by CPU 204.

Programs, applications, scripts and/or applets used to install software applications as described below may also be stored in flash memory 232.

It is desirable that users not be limited to "channels" that are pre-installed on game console 100 at the time of its purchase. For example, in some instances, game console 100 is manufactured and sent to warehouses and retail locations before one or more software applications for the console are finalized. The systems and methods described herein provide intuitive and user-friendly ways to install, among other things, such later-finalized software applications on the game console.

A first non-limiting, example method for installing user software applications onto game console 100 will be described with reference to FIGS. 5A-5D. The software applications installed in accordance with this example method are user software applications that may, for example, be arbitrarily and individually (i.e., independently of other applications) installed and deleted by a user. In contrast to user applications, system applications are installed as part of the overall system programs for game console 100 and cannot be arbitrarily and individually installed or deleted by a user.

Figure 5A:
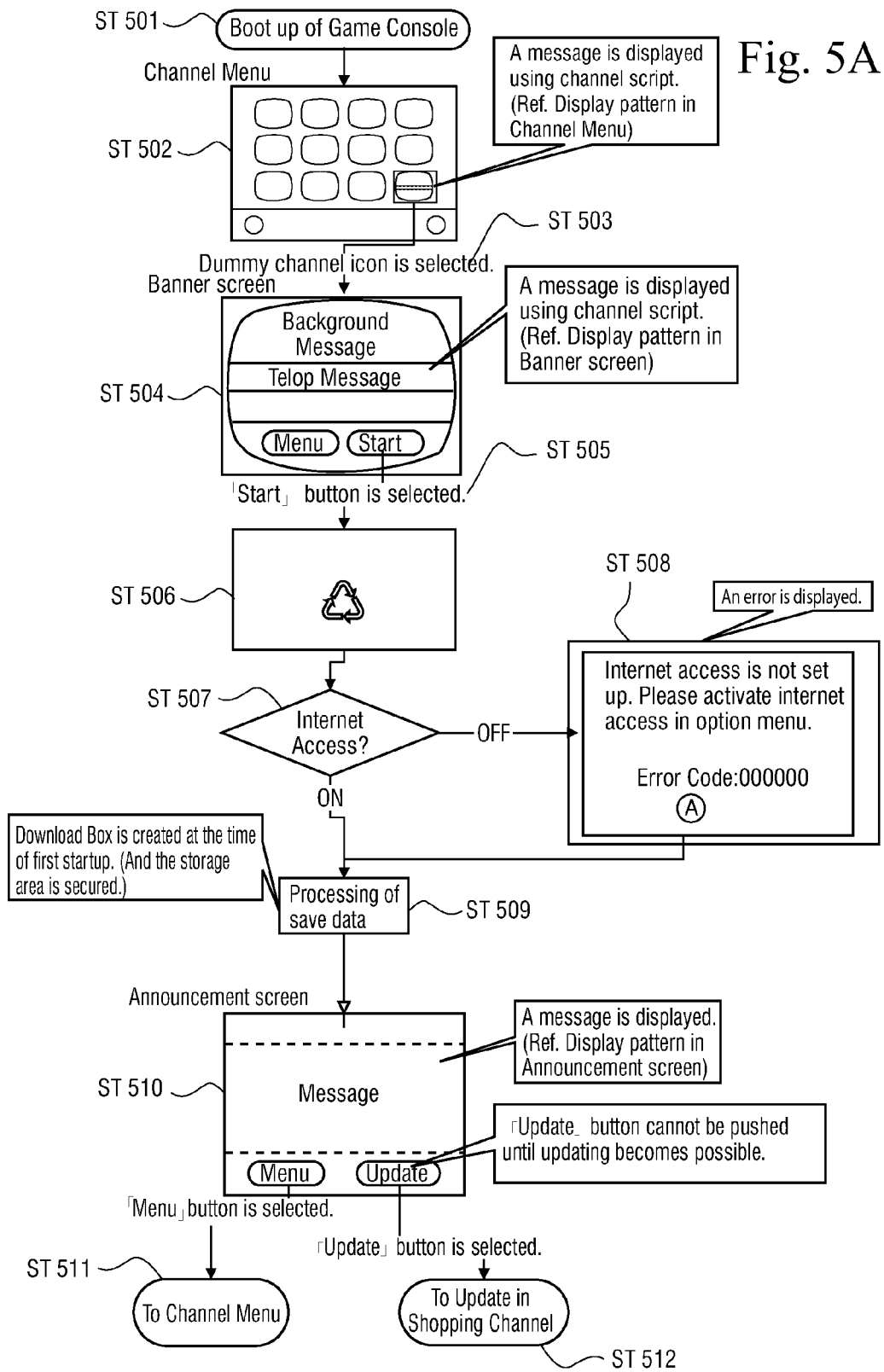
FIGS. 5A-5D are flow charts showing a first example method for installing a software application.

The overall sequence for the first example method is shown in FIG. 5A. This first example method uses so-called "dummy channels" which may be displayed on the channel menu shown in FIG. 3. The dummy channel appearance, and the operations performed when the dummy channel is selected, may be implemented using a dummy channel script which is stored, for example, in flash memory 232.

The script may be stored in the flash memory in various ways. For example, the script may be downloaded from a server (e.g., via an internet connection) and then stored in flash memory 232. This downloading may be accomplished in a variety of ways. For example, when game console 100 is booted up, the boot-up routine can, among other things, control the console to automatically access the internet to check for such channel scripts on a web site specified by the routine. In an alternative example, game console 100 may automatically check for such channel scripts on a periodic basis (e.g., once a day, once a week, every two weeks, etc.). In still another alternative example, a user may invoke the download of the channel script(s) by using an already installed application such as the shopping channel application. In this case, the user can navigate to the shopping channel on the channel menu, select the shopping channel and thereafter provide appropriate selections and inputs responsive to displayed shopping channel menus (e.g., inputting an identification number) to cause the channel script to be downloaded.

In one particular implementation of this other alternative example, the dummy channel may be for an uninstalled software application to be used with a particular game. A non-limiting example of such an application is a voice chat application that enables voice chat via the internet between or among players of a particular game. The purchaser of the game may be provided with some identification or authorization information (e.g., a number provided in the game packaging) which can be input while the user is in the shopping channel to cause the appropriate dummy channel script for the voice chat application to be downloaded. The menus of the shopping channel may be modified to provide for downloading the dummy channel script by updating the shopping channel menus on a web server (if, for example, the displayed shopping channel menus are web page contents) or by updating the shopping channel system application via a system update (if, for example, the shopping channel menus are built-into the shopping channel application itself which is running on game console 100).

At ST 501, game console 100 is booted up by, for example, powering the console on using power button 242 or re-booting the console using reset button 244.

As a result of booting up, a channel menu is displayed at ST 502. The menu is similar to that discussed above with reference to FIG. 3, except that one of the channels (which may be referred to as a "dummy" channel) corresponds to a currently uninstalled user software application. As explained below with reference to FIG. 5B, the appearance of the dummy channel (e.g., color, icon, image, graphics, text, message, etc.) on the channel menu screen is determined in accordance with the script and may be based on a variety of factors including, but not limited to, the availability/unavailability of the associated software application for download from a server.

It will be understood that other channels such as those described above (e.g., disc channel, photoviewer channel, etc.) may also be present on the menu displayed at ST 502. For simplicity and ease of illustration, details of these other channels are not shown in FIGS. 5A-5C.

The user may make a menu selection from the menu displayed at ST 502. Selections other than selection of a dummy channel do not form part of the systems and methods for installing software application(s) described herein and thus will not be discussed.

If the dummy channel is selected at ST 503, a banner screen is presented at ST 504. The banner screen includes information about the dummy channel and includes a "Menu" selection item that can be selected to return to the channel menu and a "Start" selection item that can be selected to proceed to an announcement screen providing further information about the software application and, if the software application is currently available on a server, to initiate downloading of the software application. As explained below with reference to FIG. 5C, the appearance of the banner screen (e.g., icon, message, etc.) is determined in accordance with the dummy channel script and may be based on a variety of factors including, but not limited to, the availability/unavailability of the associated software application for download from a server.

As noted, the user may select "Menu" to return to the channel menu. If the user selects "Start" at ST 505, a "progress" screen is presented at ST 506 to inform the user that processing of the "Start" selection is proceeding. The screen in FIG. 5A shows a triangular-shaped arrangement of arrows to indicate that processing is proceeding, but other types of progress indications may be used without limitation.

During this processing, a judgment is made at ST 507 as to whether game console 100 is configured to permit internet access. If console 100 is not so configured, an error message is generated at ST 508 and the user is prompted to change the settings of the game console to enable internet access before the process can proceed. If the judgment at ST 507 is that internet access is available, game console 100 performs certain preparations for downloading at ST 509 such as allocating memory space for downloading the application.

At ST 510, an announcement screen(s) is presented which contains announcements about the software application. As explained below with reference to FIG. 5D, the appearance of the announcement screen(s) (e.g., icon, message, etc.) is determined in accordance with the dummy channel script and may be based on a variety of factors including, but not limited to, the availability/unavailability of the associated software application for download from a server.

The announcement screen includes a "Menu" selection item that can be selected in order to return to the channel menu screen (ST 511) and an "Update" selection item that can be selected in order to download the software application (ST 512) if it is available for downloading. If the software application is not available for downloading, the "Update" selection item may be grayed-out to provide an indication to the user that this item is not available for selection. In this example implementation, selecting "Update" takes the user to the Shopping Channel where the download can be initiated.

Figure 5B:
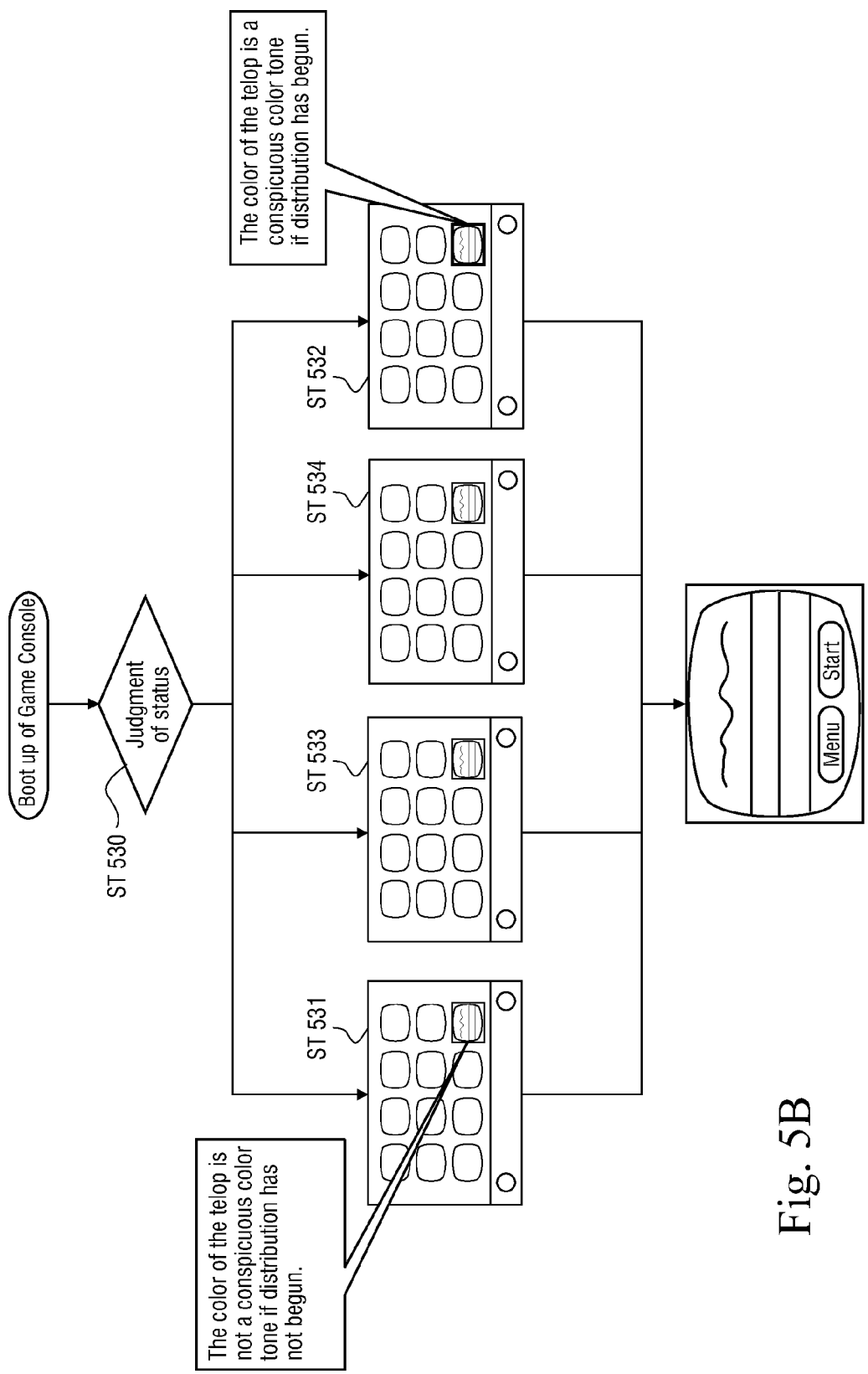

Example steps for determining the appearance of the dummy channel on the menu channel screen are described with reference to FIG. 5B.

In this example, the dummy channel includes a "telop" superimposed over a background. "Telop" is a term derived from "television opaque projector" and generally refers to text (such as captions, subtitles, or scrolling tickers) or other content (e.g., images, graphics, video, etc.) superimposed on a background. The background may itself also include text and/or other content.

When game console 100 is booted up, a judgment of status is made at ST 530. This judgment may include determining whether the dummy channel has been previously selected or started by the user and, if so, whether the software application is currently available for downloading. If the software is not currently available for downloading, the judgment at ST 530 may include determining whether the availability date of the software application is known or unknown. The judgment of availability for downloading or future availability may, for example, be based on information contained in the dummy channel script downloaded from the server, along with current time/date information, to allow game console 100 to determine whether the availability date is in the past or in the future.

If the judgment determines that the dummy channel has not previously been selected or started by a user, the color of the telop may be inconspicuous (e.g., gray) as suggested at ST 531 because, for example, the software application associated with the dummy channel may not yet be available for download. The content of the telop at ST 531 may, among other things, inform a user that information about the software application (e.g., a description, start date, game titles with which the software application may be used, etc.) is available and suggest to the user this information may be accessed by selecting the dummy channel. In short, the telop may inform the user about the application and its availability/non-availability. The telop may include text, graphics, images and may, if desired, be scrolled like a ticker, flash on and off, or controlled in some other manner to draw a user's attention.

If the judgment at ST 530 determines that the software application for the dummy channel is currently available for downloading, the color of the telop may be conspicuous (e.g., red, purple or pink) as suggested at ST 532 to draw the user's attention. The content of the telop at ST 532 may, among other things, inform a user that the software application is available for download.

If the judgment at ST 530 determines that the software application is not currently available for downloading and the date of availability is not known, the color of the telop at ST 533 may be inconspicuous and the content of the telop may, among other things, indicate that the availability date is unknown. In some instances, the telop may provide some generalized, non-specific indication of future availability (e.g., before the end of the year).

If the judgment at ST 530 determines that the software application is not currently available for downloading and the date of availability is known, the color of the telop at ST 534 may be inconspicuous and the content of the telop may, among other things, indicate the availability date (e.g., December $4^{th}$).

Figure 5C:
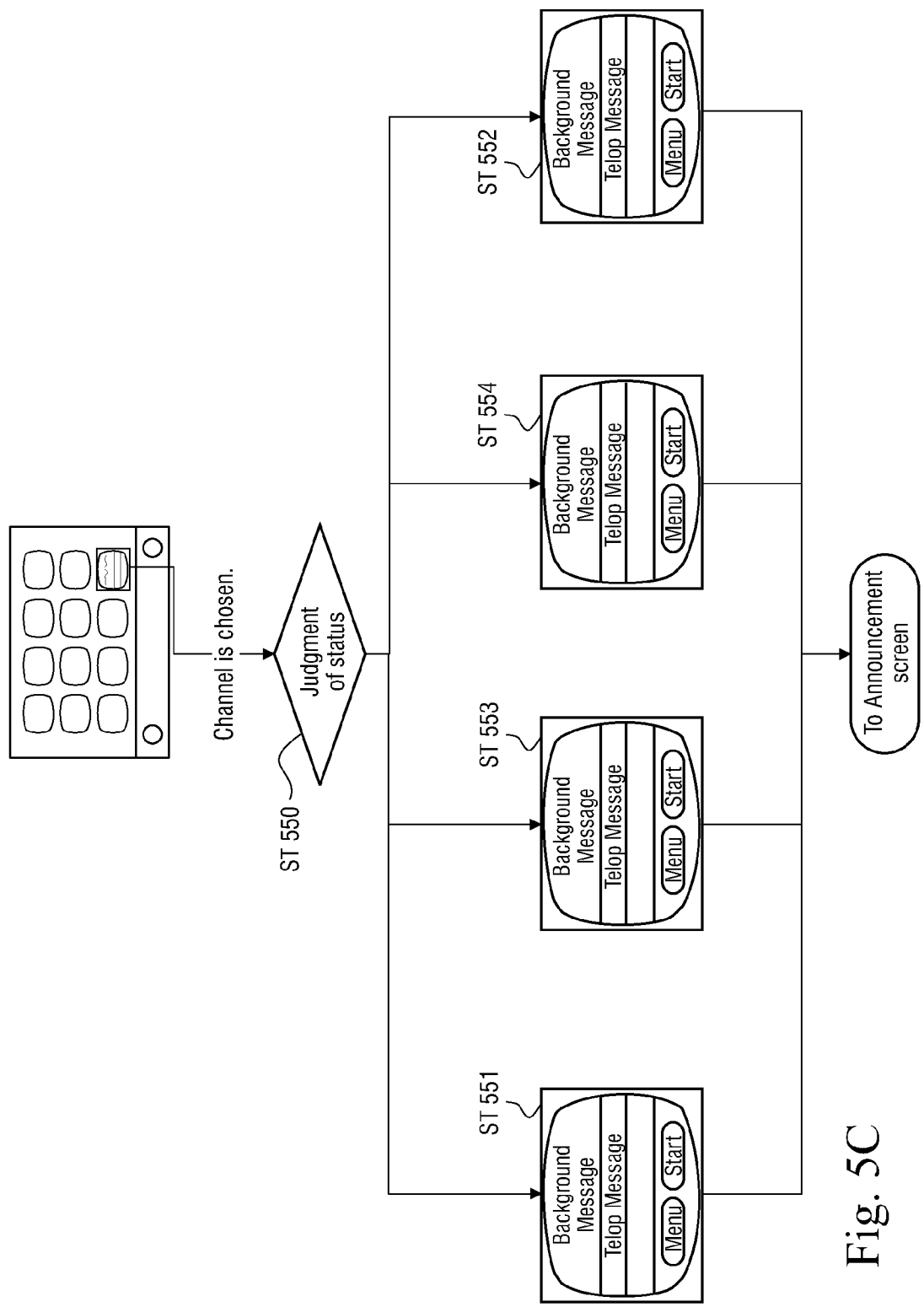

Example steps for determining the appearance of the banner screen when the dummy channel is selected are described with reference to FIG. 5C. As with the dummy channel icons, the banner screen includes a telop superimposed over a background. The banner screen also includes a "Menu" selection item for enabling the user to return to the channel menu and a "Start" selection item for accessing further information about the software application.

When the dummy channel is selected, a judgment of status is made at ST 550. This judgment is similar to that made at ST 530 (discussed with reference to FIG. 5B) and may include determining whether the dummy channel has been previously selected or started by the user and, if so, whether the software application is currently available for downloading. If the software is not currently available for downloading, the judgment at ST 550 may include determining whether the availability date of the software application is known or unknown. The judgment of availability for downloading or future availability may, for example, be based on information contained in the dummy channel script downloaded from the server, along with current time/date information for determining whether the availability date is in the past or in the future.

If the judgment at ST 550 determines that the selection is the first start-up of the dummy channel, the color of the telop may be inconspicuous (e.g., gray) as suggested at ST 551 and the content of the telop (e.g., text, images, graphics, etc.) may, among other things, inform a user that information about the software application (e.g., a description, start date, etc.) is available and prompting the user to select "Start". The background message of the banner screen may also include text, images, graphics, etc. reminding the user to make sure the internet connection of game console 100 is enabled so that the user can see the latest information about the software application.

If the judgment at ST 550 determines that the software application for the dummy channel is currently available for downloading, the color of the telop at ST 552 may be conspicuous (e.g., red, purple or pink) to draw the user's attention. The content of the telop (e.g., text, images, graphics, etc.) at ST 552 may, among other things, prompt the user to select "Start" to download the channel. A background message may also be presented, if desired.

If the judgment at ST 550 determines that the software application is not currently available for downloading and the date of availability is not known, the color of the telop at ST 553 may be inconspicuous and the content of the telop (e.g., text, images, graphics, etc.) may, among other things, indicate that the availability date is unknown. In some instances, the telop may provide some generalized, non-specific indication of future availability (e.g., before the end of the year). The background message may also include text, images, graphics, etc. reminding the user to make sure that the internet connection of game console 100 is enabled so that the user can see the latest information about the software application.

If the judgment at ST 550 determines that the software application is not currently available for downloading and the date of availability is known, the color of the telop at ST 554 may be inconspicuous and the content of the telop (e.g., text, images, graphics, etc.) may, among other things, indicate the availability date (e.g., December $4^{th}$). The background message may also include text reminding the user to make sure the internet connection of game console 100 is enabled so that the user can see the latest information about the software application.

Figure 5D:
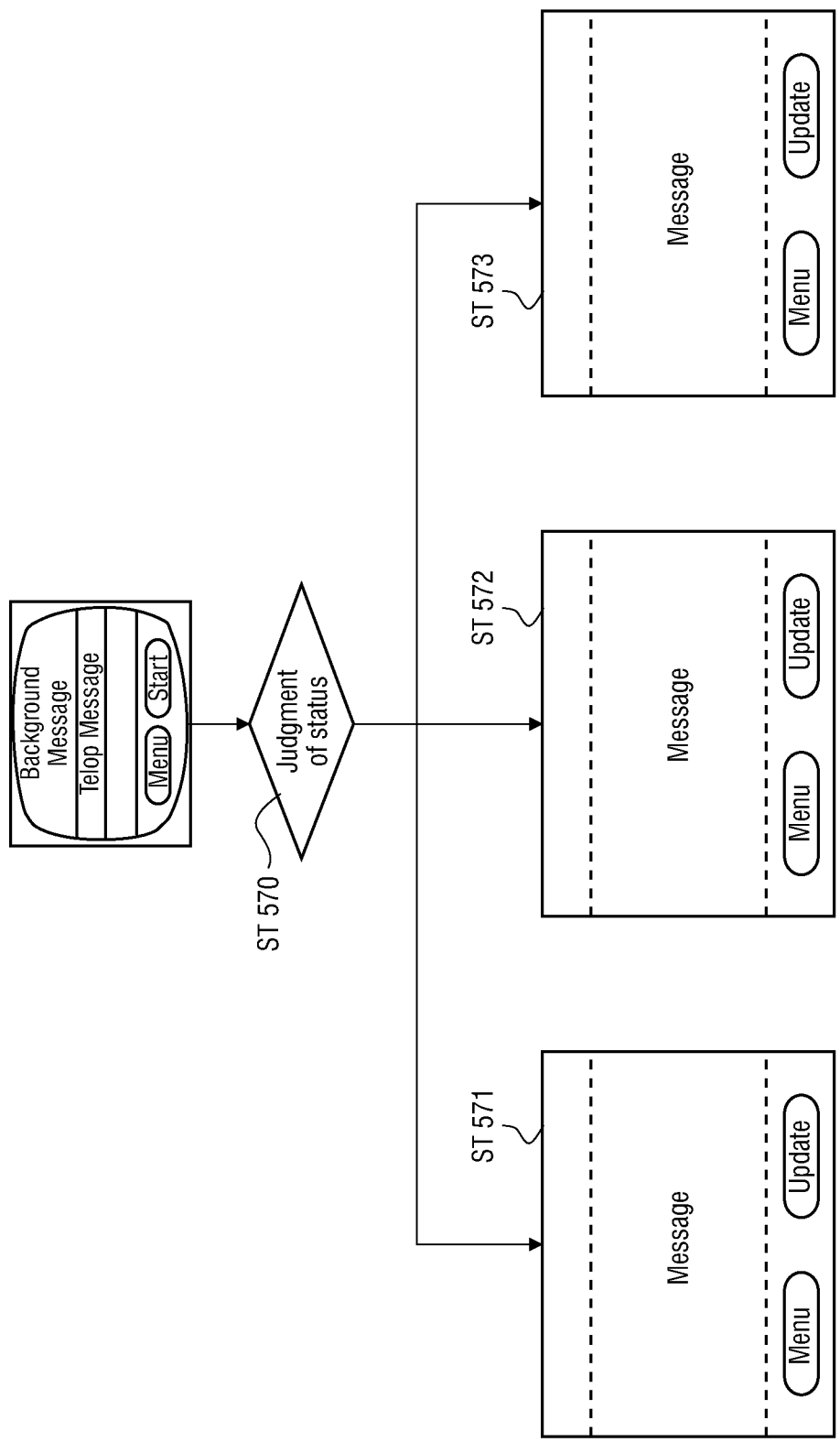

With reference to FIG. 5D, when "Start" is selected from the banner screen, a judgment of status is made at ST 570. This judgment is similar to that made at ST 530 and ST 550 and may include determining whether the dummy channel has been previously selected or started by the user and, if so, whether the software application is currently available for downloading. If the software is not currently available for downloading, the judgment at ST 570 may include determining whether the availability date of the software application is known or unknown. The judgment of availability for downloading or future availability may be based on information contained in the dummy channel script downloaded from the server, along with current time/date information for determining whether the availability date is in the past or in the future.

If the judgment at ST 570 determines that the selection is the first start-up of the dummy channel, that the software application is not currently available for downloading and the date of availability is not known, the announcement screen displayed at ST 571 includes an announcement message to this effect. The announcement may provide some generalized indication of availability (e.g., by the end of the year). In this case, the "Update" selection item on the announcement screen may be grayed out as an indication to the user that this item cannot be selected.

If the judgment at ST 570 determines that the software application is not currently available for downloading and the date of availability is known, the announcement screen displayed at ST 572 includes an announcement message to this effect which specifies, for example, the date of availability (e.g., December $4^{th}$). In this case, the "Update" selection item on the announcement screen may be grayed out as an indication to the user that this item cannot be selected.

If the judgment at ST 570 determines that the software application for the dummy channel is currently available for downloading, the announcement screen displayed at ST 573 includes an announcement message to this effect and prompts the user to select the "Update" selection item in order to download the application.

Selecting "Update" takes the user to a page (screen) of the Shopping channel from which the software application can be downloaded. This Shopping channel screen may, for example, include a download selection item which is selectable for initiating the downloading of the user software application from a server. If payment is required, the Shopping channel screen may prompt the user to enter appropriate payment information before downloading is permitted.

The downloaded user software application may be stored in flash memory 232 as mentioned above.

After downloading, the appearance of the dummy channel is changed and the channel becomes associated with the downloaded application such that selection of the channel launches the application.

A second example method for installing user software applications will be described with reference to FIGS. 6A-6G. This method uses so-called place holders for specific software application titles to be downloaded from a server via the internet. These place holders are preferably implemented by a program, application, applet or script which is pre-installed on gaming console 100 and stored, for example, in flash memory 232. These place holders may also use so-called download tasks to obtain additional information about the non-installed software application, for example, from a server to which a connection is made via the internet.

Thus, the appearance and content of the various screens may be based on the place holder program, the download task or a combination of both. Specific titles for these uninstalled applications appear on the channel menu so that users can "jumpstart" the downloading of the corresponding software applications as soon as they purchase and boot-up the video game system.

FIG. 6A shows an overall example place holder process.

At ST 601, game console 100 is started by, for example, powering the console on using power button 242 or re-booting the console using reset button 244.

A status check is performed at ST 602 and the channel menu is displayed at ST 603. The status check is discussed below with reference to FIG. 6B and is used to determine, among other things, the appearance of the place holder channel for the uninstalled software application.

The user may make a selection from the channel menu displayed at ST 603. Channel selections other than place holder channel(s) for uninstalled software application(s) do not form part of the systems and methods for installing software application(s) described herein and thus will not be discussed.

If the place holder channel for an uninstalled software application is selected at ST 604, a banner screen is presented at ST 605. The banner screen includes information about the place holder channel and includes a "Menu" selection item that can be selected to return to the channel menu and a "Start" selection item that can be selected to proceed to an announcement screen(s) providing further information about the software application and, if currently available, to initiate downloading of the software application. As explained below with reference to FIG. 6C, the appearance of the banner screen is determined in accordance with the place holder script and/or download task and may be based on a variety of factors including, but not limited to, the availability/unavailability of the associated software application for download from a server.

As noted, the user may select "Menu" at ST 605 to return to the channel menu. If the user selects "Start" at ST 606, an announcement screen is presented at ST 607 which contains announcements about the software application. The announcement screen includes a "Menu" selection item that can be selected in order to return to the channel menu screen (ST 608) and an "Update" selection item that can be selected in order to proceed via ST 609 and ST 610 to an update page within the shopping channel for downloading the software application (ST 611) if it is available for downloading. As explained below with reference to FIG. 6D, the appearance of the announcement screen(s) is determined in accordance with the place holder script and/or download task and may be based on a variety of factors including, but not limited to, the availability/unavailability of the associated software application for download from a server.

At ST 609, a "progress" screen is presented to inform the user that processing of the "Start" selection is proceeding. The screen in FIG. 6A shows a triangular-shaped arrangement of arrows to indicate that processing is proceeding, but other types of progress indications may be used without limitation.

At ST 610, the processing for proceeding to the shopping channel includes passing a code corresponding to the selected software application to the shopping channel program or script so that, for example, the process can proceed to the appropriate shopping channel page with suitable options for downloading the application.

The Shopping channel page (screen) may, for example, include a download selection item which is selectable for initiating the downloading of the user software application from a server. If payment is required, the Shopping channel screen may prompt the user to enter appropriate payment information before downloading is permitted.

The downloaded user software application may be stored in flash memory 232 as mentioned above.

After downloading, the appearance of the place holder channel is changed and the channel becomes associated with the downloaded application such that selection of the channel launches the application.

With reference to FIG. 6B, a judgment is made at ST 620 as to whether a download (DL) task for the uninstalled software application exists. A download task is a portion of the place holder script that, for example, periodically accesses a server to obtain status information about the uninstalled software application such as, but not limited to, its current availability/unavailability. Generally, the download task for a particular place holder channel accesses the server a predetermined number of times (e.g., 100 times) at a specified interval (e.g., every 24 hours) until the download task is depleted. If the download task is judged to exist at ST 620, a place holder channel is displayed in the main channel menu at ST 621 using text, graphics, images, etc. obtained at least in part by the download task. This text, graphics, etc. may vary depending on the availability/unavailability of the software application, whether the date on which the application will become available is known, etc. If the download task does not exist, a place holder channel is displayed in the channel menu at ST 622 using text, graphics, images, etc. which is determined by the settings of the place holder channel script itself.

With reference to FIG. 6C, after a place holder channel is selected from the channel menu, a judgment is made at ST 630 as to whether a download task for the uninstalled software application exists. If so, a banner screen is displayed at ST 631 using text, graphics, images, etc. obtained at least in part by the download task. This text, graphics, etc. may vary depending on the availability/unavailability of the software application, whether the date on which the application will become available is known. If the download task does not exist, a banner screen is displayed at ST 632 using text, graphics, images, etc. which is determined by the settings of the place holder channel script itself.

FIG. 6D shows additional details associated with the steps shown and discussed with reference to FIG. 6A. When "Start" is selected at ST 606, a judgment is made at ST 640 as to whether the flash memory 232 is operating properly. If not, a message to this effect is presented to the user at ST 641. If the judgment is that the memory is operating properly, a judgment is made at ST 642 as to whether a download task exists.

If the download task exists, an announcement screen is displayed at ST 643 using text, graphics, images, etc. obtained at least in part by the download task. This text, graphics, etc. may vary depending on the availability/unavailability of the software application, whether the date on which the application will become available is known. The announcement screen includes a "Menu" selection item that can be selected by the user to return to the main channel menu. The announcement screen also includes an "Update" selection item that can be selected to obtain further information if the place holder script is configured to provide such further information. In some instances, the place holder script may cause the "Update" selection item to be grayed out to indicate to the user that it cannot be selected. In this case, the user may return to the channel menu by selecting the "Menu" selection item.

If the download task does not exist, an announcement screen is displayed at ST 644 using text, graphics, images, etc. which is determined by the settings of the place holder channel script itself. The announcement screen contains an appropriate message which, for example, prompts the user to select the "Update" selection item to download the software application.

If "Update" is selected from the screen at either ST 643 or ST 644, the process proceeds to ST 645 where a judgment is made as to whether game console 100 is configured for internet access. If not, an internet configuration screen is presented to the user at ST 646 where the user can proceed to a network settings screen to set up the internet (ST 647) by selecting the "Set Up" selection item or select "Quit" to return to the announcement screen. If the game console is configured for internet access, the process proceeds via ST 609 and ST 610 as discussed above with reference to FIG. 6A.

With reference to FIG. 6E, the script corresponding to the method of FIG. 6A can be modified so that the process omits the announcement screens. Thus, as shown in FIG. 6E, if the user selects "Start" at ST 660, a judgment is made at ST 661 as to whether game console 100 is configured for internet access. If not, the process proceeds to ST 662 at which the user is prompted to configure the game console for internet access (ST 663). If the game console is configured for internet access, the process proceeds to the shopping channel at ST 664.

With reference to FIG. 6F, multiple announcement screens up to some maximum number (e.g., five) may be utilized. In this case, each announcement screen may include a selection item for navigating from one screen to another. For example, in FIG. 6F, a right arrow 670 may be selected by the user to a "next" announcement screen. If "previous" announcement screens are present, a left arrow (not shown) may be provided for selection by the user.

FIGS. 6G-1 and 6G-2 show additional details of the downloading process. At ST 681, a progress screen is shown to the user. At ST 682 and ST 683, respective judgments are made about whether the internet connection header file and the file itself are corrupt. If so, a message to this effect is displayed at ST 684. At ST 685, a judgment is made as to whether a system upgrade is necessary and, if so, a message to this effect is displayed at ST 686. At ST 687, a judgment is made as to whether there are any other fatal internet connection errors and, if so, a message to this effect is displayed at ST 688. At ST 689, a judgment is made as to whether any time outs have occurred and, if so, a message to this effect is displayed at ST 690. At ST 691, a judgment is made as to whether the internet connection is set to off and, if so, a message to this effect is displayed at ST 692. At ST 693, a judgment is made as to whether a problem exists with the internet setting. If so, a message to this effect is displayed at ST 694. At ST 695, a judgment is made as to whether there are any files on the server. If not, a message to this effect is displayed at ST 696. At ST 697, a judgment is made as to whether any other errors exist. If so, a message to this effect is displayed at ST 698.

Each of the displays at ST 684, ST 686, ST 688, ST 690, ST 692, ST 694, ST 696 and ST 698 include a "Menu" selection item that can be selected by the user to return to the channel menu. The display at ST 696 also includes a "Main Menu" selection item that can be selected by the user to return to the main menu from which, for example, a software reset can be initiated.

By selecting a place holder channel, a user can easily access information about a software application as well as a download screen for the official version of the corresponding software application. In the case of software applications not yet available for download, the user can receive updates on the service status (still under construction, started, halted, etc.). If the user prefers not to receive any service status updates or introductions to the application, then the user can change the settings on the place holder channel for that specific application. As mentioned above, the place holder script or application is pre-installed on game console 100.

Characteristics of the place holder application include:
- directly jumps to the shopping channel from which the software application can be downloaded
- notifies software application status to the user with a place holder channel through a download task and/or a channel script
- notifies software application status to the user on a banner screen through the download task and/or the channel script
- notifies software application status to the user within the place holder application
- provides an introduction to software application titles in the place holder (e.g., announcement screens including up to five static images)

As described above, an announcement screen may display an "update" button that allows the user to jump directly to a shopping channel page where the software application can be downloaded. Depending on the individual place holder application settings, the user might jump directly to the shopping channel download page by pressing a "start" button on a banner screen, bypassing the announcement screen display. In the examples described above, once the user jumps to the shopping channel, the user cannot directly return back to the place holder.

Using the place holder channel script, the place holder channel may be configured to display an animation. In this case, a text message may be displayed in a manner similar to an electronic bulletin board ("ticker") used for news updates or stock prices. In addition, the current status of the uninstalled software application can be checked using a download task, and the appearance (e.g., color) of the banner which displays the text message can be changed in accordance with this status. Specifically, the text message may, for example be displayed over a gray banner before the software application is available for download and over a pink banner after the software application becomes available.

In the above example, the download task does not function unless the place holder channel has been started at least once.

The place holder channel script can also be configured so that an animation is displayed when the banner screen is displayed. The text displayed on the place holder channel and on the banner screen can be different from one another. As with the place holder channel, the current status will be checked, and the appearance (e.g., color) of the banner used for the scrolling text may be based on this status. For example, the banner color may be gray before the software application is available for downloading and pink after the software application becomes available for downloading.

The announcement screen displays text labeled as "announcement screen display text" in the place holder script and within the download task. Additionally, by switching screens, a maximum of five (5) images (each having a resolution of, for example, 496×34 and maximum size per image of 100 Kb) can be provided prior to installing the software application to briefly explain the application. In the example method, these images are part of the place holder script and thus they cannot be updated or changed. These introductory image(s) may be displayed regardless of the current availability status of the software application.

Place holder-related information can be automatically downloaded using a download task which may, for example, be performed when the console is in stand-by mode. With download tasks, there is a preset interval and number of update checks performed until the download task is depleted. There is one download task for each place holder. In some implementations, the number of update checks may be reset, for example, each time the place holder application is started (e.g., by selecting Start from the banner screen). In addition, the download task ends when the corresponding software application is downloaded.

The download method and data downloaded is as follows:

| Download Method | Data Downloaded |
| --- | --- |
| Internet connection:<br>Update check interval: 24 hours and at start up<br>DL Task depletion: 100 times | Channel icon display text<br>Banner display text<br>Announcement screen display text<br>Status confirmation flag<br>Date on status change date |

A place holder for each application is created by placing data into a dedicated place holder framework. Data for creating an example place holder includes:
- Channel icon data
  - Scrolling text
    - Default text string
    - Text string indicating "currently being prepared"
    - Text string used during service
    - Other text strings
- Banner data (required)
  - Scrolling text
    - Default text string
    - Text string indicating "currently being prepared"
    - Text string used during service
    - Other character strings
- Title ID
- Title image for the place holder announcement screen
- Text string on the place holder announcement screen used for introduction to the official version of that application and for explanation of controls
- Text string on the place holder announcement screen used for service status notifications
- Images for introduction to the official version of that application (0-5 images) used within the place holder Aside from using the pre-set text strings in the place holder, text strings obtained using the download task can also be used as various text strings for the scrolling texts and notifications.

When creating a place holder, a place holder with different actions can be created for each individual application by entering necessary data and option settings into the place holder framework. Options that can be set for each application include:

| Set-up Area | Set-up Data |
|---|---|
| Channel menu icon | Whether or not the scrolling text will be displayed ON/OFF |
| | Banner color of scrolling text |
| Banner screen | Whether or not the scrolling text will be displayed ON/OFF |
| | Banner color of scrolling text |
| Behavior within application | Whether or not the application connects directly to the Shopping Channel when the "Start" button is pressed on the banner screen |
| | Whether or not the service status is displayed ON/OFF |

The dummy and place holder channels can be used to "reserve" space on the channel menu. In particular, the game console may limit the channel menu to only displaying up to a certain maximum number of channel icons. As mentioned above, this limitation is not a storage capacity issue, but rather a user interface management issue. By using the dummy and place holder channels, users are better able to manage the channel menu and product and software developers can see what "real estate" of the channel menu is accounted for during development. The dummy and place holder channels also enable better memory and user interface management since a user can decide not to download software application(s) he or she is not interested in.

Moreover, unlike system applications which must all be updated together, the user applications associated with the dummy channels and place holder channels described herein can be installed (or not installed) independently and separately from each other based upon a user's preferences. Also unlike system applications, these user applications can be deleted independently and separately from each other (and without a system update) based upon a user's preferences.

The dummy and place holder channels also provide significant flexibility in software development schedules. It can be difficult to coordinate hardware and software development schedules so that all software applications are completed at the time a product is manufactured and shipped for sale. Dummy and place holder channels allow the product to be manufactured and shipped and the software applications to be installed after purchase without the need for a system update. In addition, the user can be provided with relevant information about such applications (e.g., availability date) and this information is dynamic (e.g., can be updated) and can be conveyed to users in an intuitive and user-friendly way (e.g., by the appearance (including color) of a channel menu icon for the uninstalled software application).

The dummy and place holder channels also allow for easier localization of products and software applications in cases in which a system may be configured differently for different markets (e.g., the U.S., European and Japanese markets). In addition to language differences, the look-and-feel of a software application may be different in different markets. Using dummy channels or place holders, a software application developed for a specific market may be easily installed by a user after purchase.

Generally speaking, the systems, methods, and techniques described herein may be implemented in digital electronic circuitry, computer hardware, firmware, software, or in combinations of these elements. Apparatus embodying these techniques may include, for example, appropriate input and output devices, a computer processor, and a computer program product tangibly embodied in a machine-readable non-transitory storage device for execution by a programmable processor. A process embodying these techniques may be performed by a programmable processor executing a program of instructions to perform desired functions by operating on input data and generating appropriate output. The techniques may be implemented in one or more computer programs, applications, scripts, applets, routines, subroutines, etc. that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of volatile and non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits). The computer program instructions may also be provided as data signals embodied in a carrier wave or other propagation medium via a communication link (e.g., a modem or network connection).

While certain example systems and methods have been described herein, it is to be understood that the appended claims are not to be limited to the systems and methods disclosed, but on the contrary, are intended to cover various modifications and equivalent arrangements included within the spirit and scope of the appended claims.

We claim:

1. A computer apparatus comprising:
   a processor coupled to a memory storing a program, wherein the processor executes the program to perform operations comprising:
   displaying an application menu screen comprising a plurality of display locations, the display locations respectively displaying at least a selectable first menu item for an uninstalled first application and a selectable second menu item for an installed second application;
   in response to selection of the second menu item, executing the second application;
   periodically determining availability/unavailability of the first application for download from another computer apparatus;
   in response to selection of the first menu item if the most recent periodic determining has determined that the first application is unavailable for download from the other computer apparatus, providing announcement information about the first application;
   in response to selection of the first menu item if the most recent periodic determining has determined that the first application is available for download from the other computer apparatus, initiating a process for downloading and installing the first application; and in response to selection of the first menu item after the first application is installed, executing the first application.

2. The computer apparatus according to claim 1, wherein the display location of the first menu item does not change after the first application is downloaded and installed.

3. The computer apparatus according to claim 1, wherein the display locations are arranged in an array.

4. The computer apparatus according to claim 1, wherein the first menu item comprises an icon.

5. The computer apparatus according to claim 1, wherein the other computer apparatus is a server.

6. The computer apparatus according to claim 1, wherein the announcement information comprises text.

7. The computer apparatus according to claim 1, wherein the application menu screen has a fixed number of display locations.

8. The computer apparatus according to claim 1, wherein the second application comprises one of a news application, a weather forecast application and a browser.

9. The computer apparatus according to claim 1, embodied as a smart phone.

10. The computer apparatus according to claim 1, embodied as a video game apparatus.

11. The computer apparatus according to claim 1, embodied as a hand-held video game apparatus.

12. A non-transitory computer readable storage medium including a program stored thereon, the program, when executed by a computer apparatus, performing operations comprising:
   displaying an application menu screen comprising a plurality of display locations, the display locations respectively displaying at least a selectable first menu item for an uninstalled first application and a selectable second menu item for an installed second application;
   in response to selection of the second menu item, executing the second application;
   periodically determining availability/unavailability of the first application for download from another computer apparatus;
   in response to selection of the first menu item if the most recent periodic determining has determined that the first application is unavailable for download from the other computer apparatus, providing announcement information about the first application;
   in response to selection of the first menu item if the most recent periodic determining has determined that the first application is available for download from the other computer apparatus, initiating a process for downloading and installing the first application; and
   in response to selection of the first menu item after the first application is installed, executing the first application.

13. The non-transitory computer readable storage medium according to claim 12, wherein the display location of the first menu item does not change after the first application is downloaded and installed.

14. The non-transitory computer readable storage medium according to claim 12, wherein the display locations are arranged in an array.

15. A computer system including or coupled to a display, the computer system comprising:
   an input device;
   a communication circuit;
   a memory storing a program; and
   a processor coupled to a memory, wherein the processor executes the program to perform operations comprising:
      displaying on the display an application menu screen comprising a plurality of display locations, the display locations respectively displaying at least a selectable first menu item for an uninstalled first application and a selectable second menu item for an installed second application;
      in response to selection of the second menu item using the input device, executing the second application;
      periodically determining availability/unavailability of the first application for download by accessing a computer over a network by using the communication circuit;
      in response to selection of the first menu item using the input device if the most recent periodic determining has determined that the first application is unavailable for download from the computer, providing announcement information about the first application;
      in response to selection of the first menu item using the input device if the most recent periodic determining has determined that the first application is available for download from the computer, initiating a process for downloading and installing the first application; and
      in response to selection of the first menu item using the input device after the application is installed, executing the first application.

16. The computer system according to claim 15, wherein the input device comprises a remote control.

17. The computer system according to claim 15, embodied as a video game system.

18. The computer system according to claim 15, wherein the display location of the first menu item does not change after the first application is downloaded and installed.

19. The computer system according to claim 15, wherein the display locations are arranged in an array.

20. A method for use with a computer apparatus, comprising:
   displaying an application menu screen comprising a plurality of display locations, the display locations respectively displaying at least a selectable first menu item for an uninstalled first application and a selectable second menu item for an installed second application;
   in response to selection of the second menu item, executing the second application;
   periodically determining availability/unavailability of the first application for download from another computer apparatus;
   in response to selection of the first menu item if the most recent periodic determining has determined that the first application is unavailable for download from the other computer apparatus, providing announcement information about the first application;
   in response to selection of the first menu item if the most recent periodic determining has determined that the first application is available for download from the other computer apparatus, initiating a process for downloading and installing the first application; and
   in response to selection of the first menu item after the application is installed, executing the first application.

21. The method according to claim 20, wherein the display location of the first menu item does not change after the first application is downloaded and installed.

22. The method according to claim 20, wherein the display locations are arranged in an array.

* * * * *

UNITED STATES PATENT AND TRADEMARK OFFICE
CERTIFICATE OF CORRECTION

Page 1 of 1

PATENT NO. : 9,110,753 B2
APPLICATION NO. : 14/080521
DATED : August 18, 2015
INVENTOR(S) : Yamamoto et al.

It is certified that error appears in the above-identified patent and that said Letters Patent is hereby corrected as shown below:

Title page

Item (72) Inventors: change "Tsutomo Kaneshige." to --Tsutomu Kaneshige--

Signed and Sealed this
Twenty-fourth Day of May, 2016

Michelle K. Lee
*Director of the United States Patent and Trademark Office*